US011338505B2

(12) United States Patent
Flitsch et al.

(10) Patent No.: US 11,338,505 B2
(45) Date of Patent: May 24, 2022

(54) METHODS AND APPARATUS FOR MOBILE ADDITIVE MANUFACTURING OF ADVANCED ROADWAY SYSTEMS

(71) Applicants: Robert A. Flitsch, New Windsor, NY (US); Frederick A. Flitsch, New Windsor, NY (US)

(72) Inventors: Robert A. Flitsch, New Windsor, NY (US); Frederick A. Flitsch, New Windsor, NY (US)

( * ) Notice: Subject to any disclaimer, the term of this patent is extended or adjusted under 35 U.S.C. 154(b) by 44 days.

(21) Appl. No.: 17/072,029

(22) Filed: Oct. 15, 2020

(65) Prior Publication Data

US 2021/0039308 A1 Feb. 11, 2021

Related U.S. Application Data

(60) Continuation-in-part of application No. 16/853,046, filed on Apr. 20, 2020, now Pat. No. 10,836,107,
(Continued)

(51) Int. Cl.
*B29C 64/118* (2017.01)
*B33Y 30/00* (2015.01)
(Continued)

(52) U.S. Cl.
CPC .......... *B29C 64/118* (2017.08); *B29C 64/106* (2017.08); *B29C 64/20* (2017.08); *B29C 64/227* (2017.08); *B29C 64/245* (2017.08); *B29C 64/386* (2017.08); *B29C 64/393* (2017.08); *B33Y 10/00* (2014.12); *B33Y 30/00* (2014.12); *B33Y 50/02* (2014.12); *E01C 11/005* (2013.01); *E01C 23/06* (2013.01); *E01C 23/065* (2013.01);
(Continued)

(58) Field of Classification Search
CPC ..... B29C 64/118; B29C 64/106; B29C 64/20; B29C 64/227; B29C 64/386; B29C 64/245; B29C 64/393
See application file for complete search history.

(56) References Cited

U.S. PATENT DOCUMENTS 2,082,259 A 6/1937 Peden
2,126,869 A 8/1938 William et al.
(Continued)

FOREIGN PATENT DOCUMENTS

CN 202202237 U 4/2012
CN 202202237 U 4/2012
(Continued)

*Primary Examiner* — Nahida Sultana

(57) ABSTRACT

The present disclosure provides various aspects for mobile and automated processing utilizing additive manufacturing. The present disclosure includes methods for adding line features to a roadway surface. In some examples, the line features may include wires, conduits and electronic components. In some examples, the mobile additive manufacturing apparatus may create communication means into an advanced roadway in line features, which may be used for various communications including communications to and from autonomous vehicles. The communications may involve data related to the operation of systems of autonomous vehicles. In other examples, the line features may be dynamically colored with LED components.

20 Claims, 23 Drawing Sheets

Related U.S. Application Data which is a continuation of application No. 16/692,993, filed on Nov. 22, 2019, now Pat. No. 10,661,505, which is a continuation of application No. 16/233,439, filed on Dec. 27, 2018, now Pat. No. 10,525,631, which is a division of application No. 15/963,767, filed on Apr. 26, 2018, now Pat. No. 10,201,932, which is a division of application No. 15/641,509, filed on Jul. 5, 2017, now Pat. No. 9,987,792, and a division of application No. 15/639,766, filed on Jun. 30, 2017, now Pat. No. 9,988,772, said application No. 15/641,509 is a continuation of application No. 14/310,556, filed on Jun. 20, 2014, now Pat. No. 9,724,877, which is a continuation of application No. 14/310,443, filed on Jun. 20, 2014, now abandoned, said application No. 15/639,766 is a continuation of application No. 14/310,556, filed on Jun. 20, 2014, now Pat. No. 9,724,877.

(60) Provisional application No. 61/838,302, filed on Jun. 23, 2013.

(51) Int. Cl.

| | | |
|---|---|---|
| *B33Y 50/02* | (2015.01) | |
| *B29C 64/227* | (2017.01) | |
| *B29C 64/245* | (2017.01) | |
| *B29C 64/386* | (2017.01) | |
| *B29C 64/20* | (2017.01) | |
| *B29C 64/106* | (2017.01) | |
| *B29C 64/393* | (2017.01) | |
| *B33Y 10/00* | (2015.01) | |
| *B29L 31/00* | (2006.01) | |
| *E01C 23/01* | (2006.01) | |
| *B22F 10/10* | (2021.01) | |
| *E01C 11/00* | (2006.01) | |
| *E01C 23/06* | (2006.01) | |
| *E01C 23/07* | (2006.01) | |
| *E01C 23/09* | (2006.01) | |

(52) U.S. Cl.
CPC .......... *E01C 23/07* (2013.01); *E01C 23/0966* (2013.01); *B22F 10/10* (2021.01); *B29L 2031/776* (2013.01); *E01C 23/01* (2013.01); *Y02P 10/25* (2015.11)

(56) References Cited

U.S. PATENT DOCUMENTS

| | | |
|---|---|---|
| 4,842,441 A | 6/1989 | Watkins |
| 4,881,361 A | 11/1989 | Dalton |
| 5,217,653 A | 6/1993 | Mashinsky et al. |
| 5,294,210 A | 3/1994 | Lemelson |
| 5,614,670 A | 3/1997 | Nazarian et al. |
| 6,206,607 B1 | 3/2001 | Medico, Jr. et al. |
| 6,299,934 B1 | 10/2001 | Manning |
| 6,391,251 B1 | 5/2002 | Keicher et al. |
| 7,445,441 B2 | 11/2008 | West et al. |
| 8,414,280 B2 | 4/2013 | Pettis |
| 9,231,498 B2 | 1/2016 | Hashimoto et al. |
| 9,255,364 B2 | 2/2016 | Ichikawa |
| 9,637,870 B1 | 5/2017 | Coe |
| 9,903,078 B2 | 2/2018 | Ali |
| 2001/0020058 A1 | 9/2001 | Kamaishi et al. |
| 2005/0065400 A1 | 3/2005 | Banik et al. |
| 2006/0240183 A1 | 10/2006 | Pollard et al. |
| 2006/0258912 A1 | 11/2006 | Belson et al. |
| 2007/0164641 A1 | 7/2007 | Pelrine et al. |
| 2008/0253834 A1* | 10/2008 | Colvard ............... E01C 19/006 404/84.05 |
| 2008/0276834 A1 | 11/2008 | Jorda |
| 2009/0000323 A1 | 1/2009 | Walker |
| 2010/0041795 A1 | 2/2010 | Wilson, Jr. |
| 2010/0121476 A1 | 5/2010 | Kritchman |
| 2010/0275817 A1 | 11/2010 | Williams et al. |
| 2011/0089610 A1 | 4/2011 | El-Siblani et al. |
| 2011/0146111 A1 | 6/2011 | Pender |
| 2011/0233105 A1 | 9/2011 | Bailey |
| 2012/0031724 A1 | 2/2012 | Noll et al. |
| 2013/0051913 A1 | 2/2013 | Eul |
| 2013/0295338 A1* | 11/2013 | Keating ............... B28B 19/003 428/174 |
| 2014/0084517 A1 | 3/2014 | Sperry et al. |
| 2014/0203479 A1 | 7/2014 | Teken et al. |
| 2014/0232035 A1 | 8/2014 | Bheda |
| 2014/0268604 A1 | 9/2014 | Wicker et al. |
| 2015/0079214 A1 | 3/2015 | Shi et al. |
| 2015/0132425 A1 | 5/2015 | Lacaze et al. |
| 2015/0140150 A1 | 5/2015 | Schmehl et al. |
| 2015/0171305 A1 | 6/2015 | Hashimoto et al. |
| 2016/0136730 A1 | 5/2016 | McMurtry et al. |
| 2016/0209511 A1 | 7/2016 | Dolinar et al. |
| 2016/0229124 A1 | 8/2016 | Koshikawa |
| 2016/0236411 A1 | 8/2016 | Ohnishi |
| 2016/0325498 A1 | 11/2016 | Gelbart |
| 2017/0001379 A1 | 1/2017 | Long |
| 2017/0129180 A1 | 5/2017 | Coates et al. |
| 2017/0136697 A1 | 5/2017 | Kia et al. |
| 2017/0145640 A1 | 5/2017 | Coe |
| 2017/0246684 A1 | 8/2017 | Hellestam |
| 2017/0298580 A1 | 10/2017 | Flitsch et al. |
| 2018/0297115 A1 | 10/2018 | Diwinsky et al. |
| 2018/0370148 A1 | 12/2018 | Sekine et al. |
| 2019/0111619 A1 | 4/2019 | Schalk et al. |
| 2019/0160743 A1 | 5/2019 | Matsubara et al. |
| 2020/0376581 A1* | 12/2020 | Humphreys ........... B33Y 80/00 |

FOREIGN PATENT DOCUMENTS

| | | |
|---|---|---|
| CN | 102953312 A | 3/2013 |
| EP | 2772626 A1 | 9/2014 |
| WO | 2009048828 A1 | 4/2009 |
| WO | 2012087150 A1 | 6/2012 |

\* cited by examiner

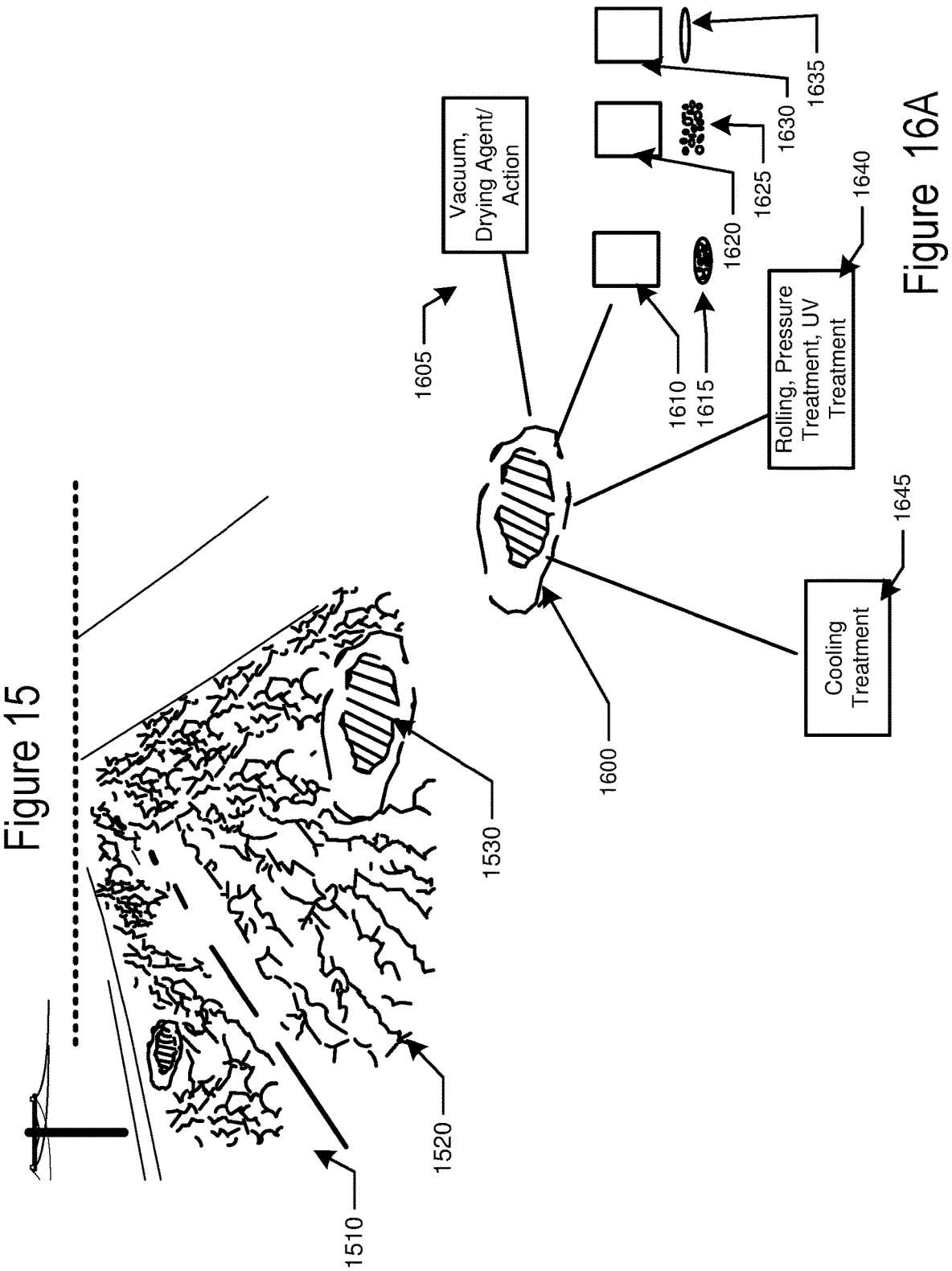

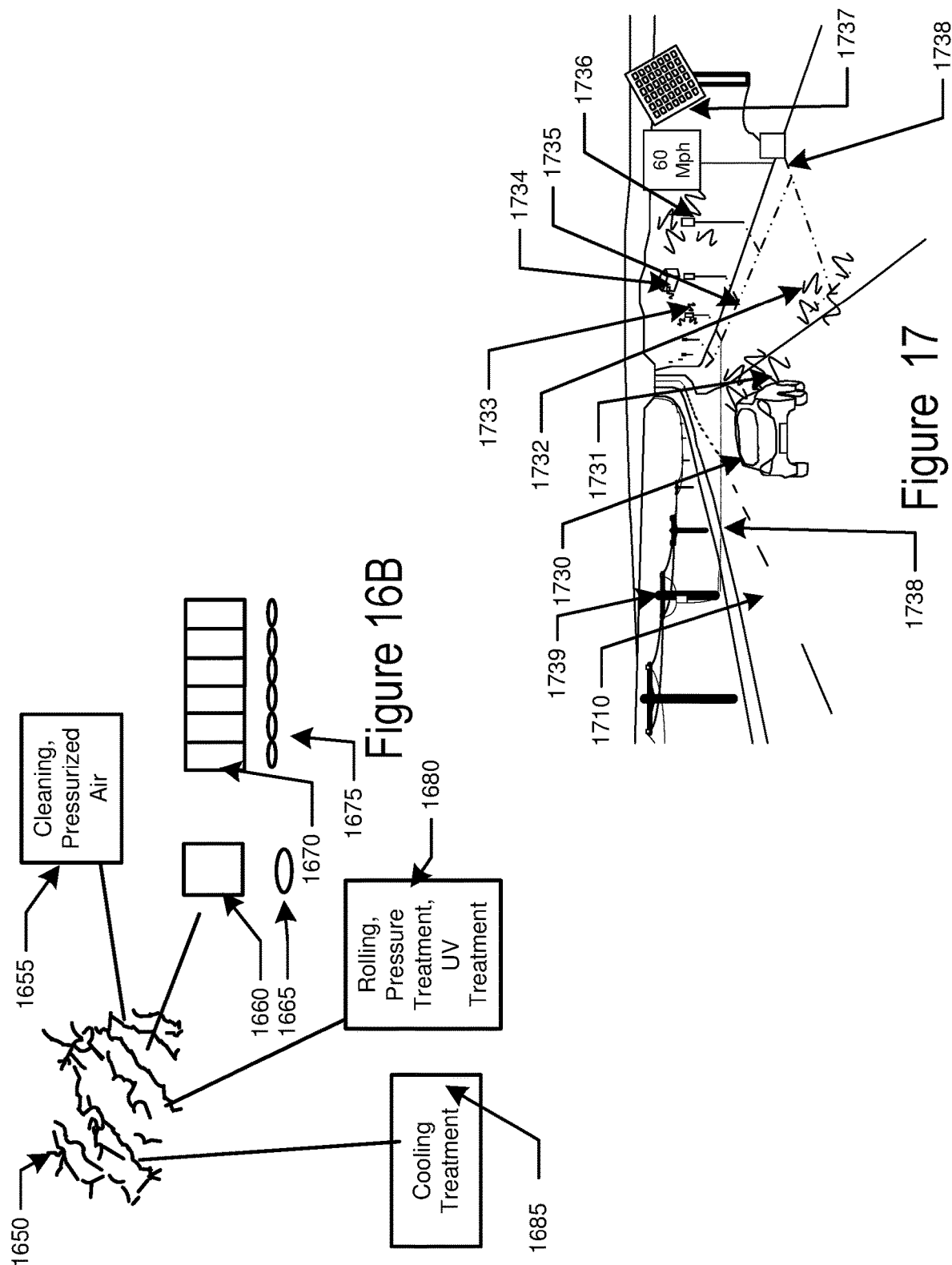

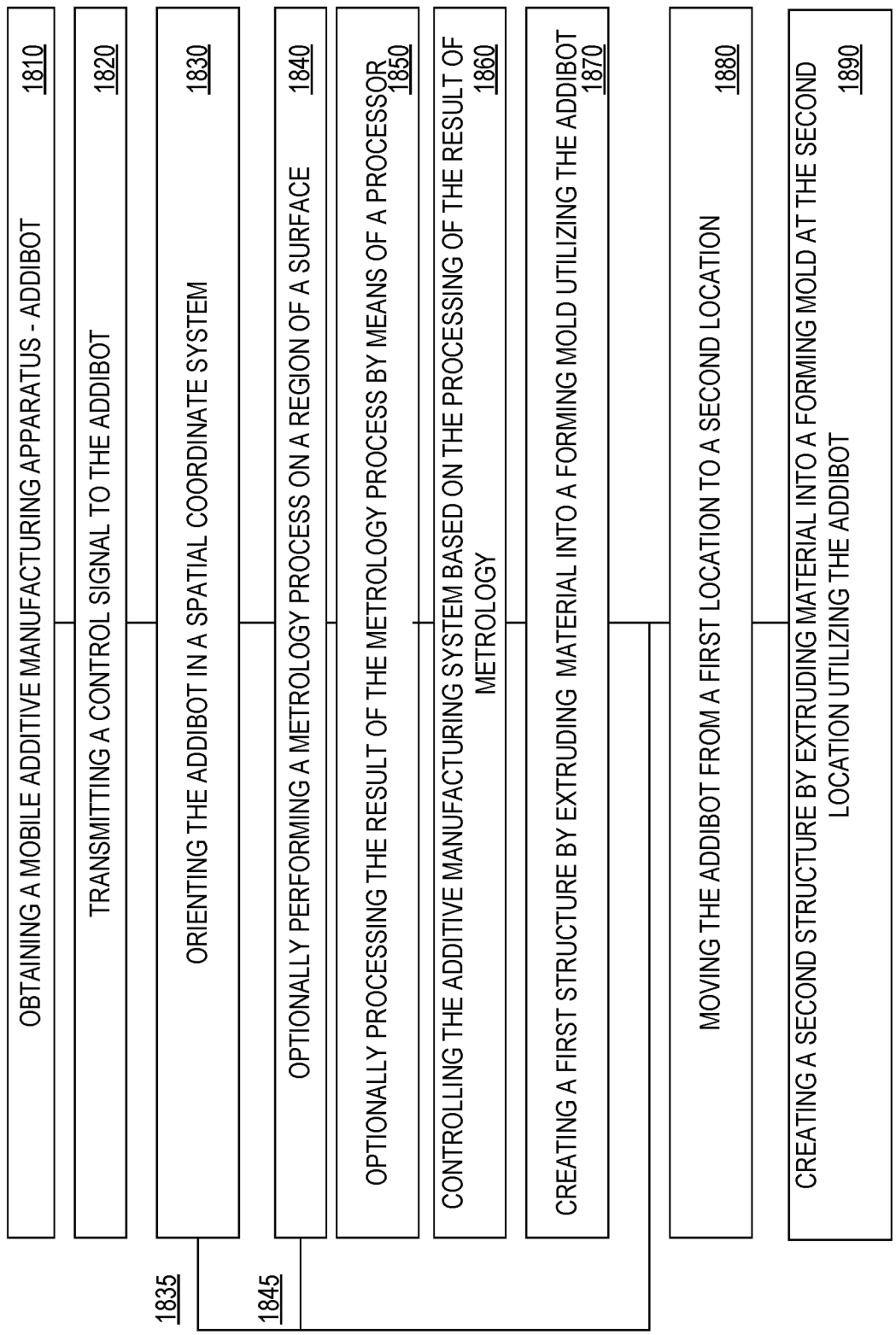

Figure 19D
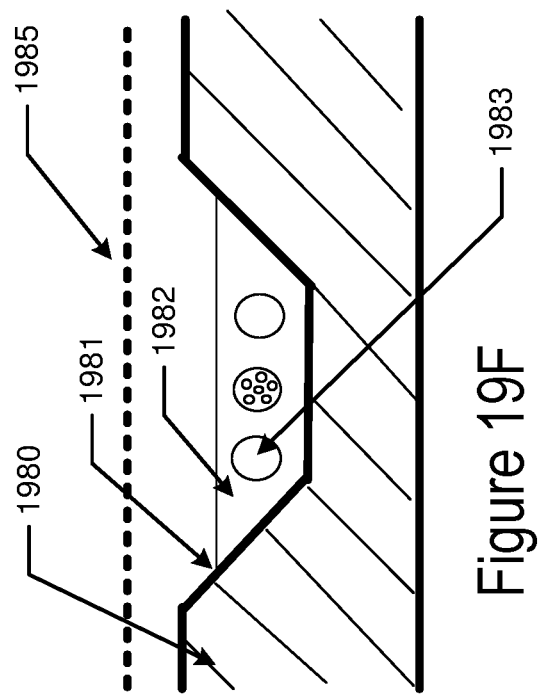
Figure 19F
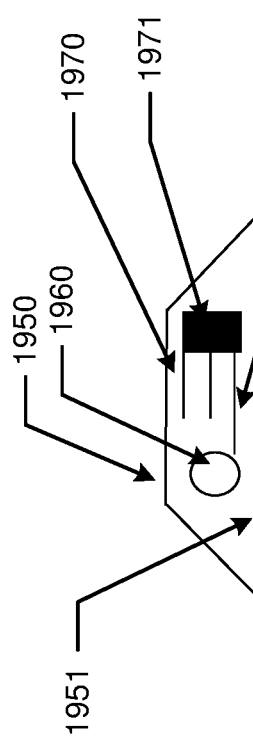
Figure 19C
Figure 19E

METHODS AND APPARATUS FOR MOBILE ADDITIVE MANUFACTURING OF ADVANCED ROADWAY SYSTEMS

CROSS REFERENCE TO RELATED APPLICATION

This application claims priority to the U.S. Non-Provisional patent application Ser. No. 16/853,046, filed on Apr. 20, 2020 as a Continuation in Part Application, which in turn claims priority to the U.S. Non-Provisional patent application Ser. No. 16/692,993, filed on Nov. 22, 2019 as a Continuation Application, which in turn claims priority to the U.S. Non-Provisional patent application Ser. No. 16/233,439, filed on Dec. 27, 2018 as a Continuation Application. The application Ser. No. 16/233,439 in turn claims priority to the U.S. Non-Provisional patent application Ser. No. 15/963,767, filed on Apr. 26, 2018 as a Continuation Application. The application Ser. No. 15/963,767 in turn claims priority to the U.S. Non-Provisional patent application Ser. No. 15/641,509, filed on Jul. 5, 2017 as a Divisional Application. The application Ser. No. 15/641,509 in turn claims priority to the U.S. Non-Provisional patent application Ser. No. 14/310,443, filed on Jun. 20, 2014 as a Continuation in Part. The application Ser. No. 14/310,443 in turn claims the benefit of the U.S. Provisional Application Ser. No. 61/838,302 filed on Jun. 23, 2013. The application Ser. No. 15/561,509 also claims priority to the U.S. Non-Provisional patent application Ser. No. 14/310,556, filed on Jun. 20, 2014 as a Continuation in Part. The U.S. Non-Provisional patent application Ser. No. 16/692,993, filed on Nov. 22, 2019 claims priority to the U.S. Non-Provisional patent application Ser. No. 15/639,766, filed on Jun. 30, 2017 as a Continuation in Part. The contents of each are hereby incorporated by reference.

FIELD OF THE INVENTION

The present disclosure relates to methods and apparatus that support mobile additive material processing. Robotic and human controlled mobility may be combined with additive manufacturing techniques that "print" or additively deliver materials to specific locations over significant distances. The methods and apparatus may be applied to the productions of advanced building structures and roadways.

BACKGROUND OF THE INVENTION

A known class of approaches to material fabrication can be classified as additive manufacturing. Material in various forms, including solid, powder, gel, gas or liquid forms may be processed in such a manner to deposit or lock in material in a target location in space.

Numerous techniques may be utilized to perform additive manufacturing. In extrusion processes, materials in wire or filament form are controlled by an extrusion head which may be moved above a work area. The use of multiple extrusion heads and extrusion material may allow for both permanent and temporary structures to be formed. By building the extruded material in layers or in regions, complex shapes may be formed in three dimensions. However, the technology is limited by the dimensions of the work space—the ability of the head or heads to move in the two dimensions of a plane and also by the dimension of the ability of the head to move vertically relative to a planar support structure. There may be numerous variations on this form of additive manufacturing.

A different class of additive manufacturing may be classified as Stereolithography. In this class, a light or heat source is used to transform the material in space. In some Stereolithography implementations, the work support plane is submerged in a photoactive or thermo-active liquid and a laser or other light or heat source is rastered across a thin surface layer of the liquid between the support structure and the top level of the liquid. By translating the support structure down a layer into the liquid, the fluent nature of the liquid reforms a thin layer of new unreacted material over the work surface or the previously processed layer.

Versions of Stereolithography may also work with powder formed starting material. The powder may be shaped into a thin layer and then spatially defined. Lasers may be used to transform portions of the layer into a solidified material. In other examples, other energy sources such as, for example, electron beams, may be used to transform the powder. Various materials including metals, insulators and plastics may be formed into three dimensional shapes by these processing techniques.

A different type of processing occurs when a print head is used to deposit material onto the powder. The deposit may chemically react with the powder or may be an adhesive that consolidates the powder into an adhered location. The prevalence of high resolution printing technology may make this type of additive manufacturing process cost effective.

The field is both established, with versions of additive manufacturing being practiced for decades, and emerging, with new techniques and materials being defined with rapidity. The technology may be currently limited by the dimensions of objects that may be produced. Accordingly, it may be desirable to develop methods and apparatus that may allow additive manufacturing techniques and apparatus to be independently mobile.

SUMMARY OF THE INVENTION

Accordingly, the present disclosure provides description for methods and apparatus that allow for mobile additive manufacturing. In some examples, the mobile additive manufacturing apparatus may act in an independent or automated manner. The apparatus that performs the mobile additive manufacturing may be called an Addibot (ADDItive roBOT).

An important characteristic of additive manufacturing apparatus may be that material is added to a product in a controlled manner that is driven by a digital model that resides in a controller. Through the processing of the additive manufacturing apparatus the digital representation may be translated to a physical approximation of material placed in three dimensional space.

Accordingly in some examples disclosed in this disclosure, a mobile additive manufacturing apparatus, which may be called an Addibot, may be configured to comprise a drive system which may be operative to move the apparatus along a surface. In some examples the Addibot may function with no physical tether. In addition, the Addibot may comprise a navigation system which among other functions may determine the Addibot's current location and its current bearing or direction that it would travel in when caused to move or is travelling in if moving.

The Addibot may additionally comprise a controller capable of executing code which may perform an algorithmic function. In some examples such a controller may also be classified as an algorithmic processor. The controller may also provide controlling signals to other elements of the Addibot. The Addibot may additionally comprise an additive manufacturing system to deposit a material or combination of materials in prescribed locations across the surface that the Addibot is on or will move to during its processing. The additive manufacturing system may add material to a surface based on a digital model that may be processed in one or more controllers that may be located in the Addibot. The origin of the digital model may be determined externally to the Addibot or alternatively may be determined by sensing or other processing of the Addibot, or may be a combination of external model definition combined with the data related to sensing apparatus within the Addibot. The systems that the Addibot has may be powered by a power system capable of providing power to operate at least the drive system, the navigation system, the control system and the additive manufacturing system of the Addibot. In some examples multiple power systems may be present in an Addibot.

In some examples, an additive manufacturing robot may be used to paint or deposit line features upon or within a roadway surface. A deposited line feature may include a thermoplastic base material that may be melted upon a roadway surface. In other examples, adhesives may be used to adhere a deposited line feature upon a surface and both adhesives and thermoplastic melting of a line feature may be used to attach or imbed the feature to the roadway. In some examples, a spool of line material may be used to store and prepare the material to be deposited upon or within the roadway. In some examples, the line material may be a composite of a base material with embedded features such as wires, optical fibers, electronics and the like that may be deposited to the roadway as an integral part. The line material may have a varied thickness from a small form factor such as one or more centimeters to wide features 10 or more centimeters in width. The line material may have inherent color variations to match line features such as yellow, white and black, wherein the black features may be used to match a roadway and allow for dashed lines in passing lanes. In still further examples, the coloration may be added by the additive manufacturing robot while the line feature is being installed or thereafter.

One general aspect includes a method for depositing a line feature upon a roadway. The method also includes transmitting a control signal to an apparatus, where the apparatus is a mobile additive manufacturing apparatus may include: a controller capable of executing algorithms and providing control signals, an additive manufacturing system to deposit a line feature material at prescribed locations across a surface of the roadway according to a first digital model processed by the controller, a drive system operative to transport the additive manufacturing system along the surface, a navigation system to determine a location of the mobile additive manufacturing system and guide the drive system, and a power system capable of providing power to operate at least the drive system, navigation system, controller and additive manufacturing system. The method also includes adding a first material to the roadway with the mobile additive manufacturing apparatus, where the first material is stored as a roll of preformed line feature material; moving the mobile additive manufacturing apparatus with the drive system to a new location, confirming the location of the mobile additive manufacturing system with the navigation system, and adding the first material to the roadway when the mobile additive manufacturing system is at the new location.

Implementations may include one or more of the following features. The method where the mobile additive manufacturing apparatus operates autonomously. The line feature material may include a base formed of thermoplastic material. The line feature material may be heated by the mobile additive manufacturing apparatus. The line feature material may include an embedded wire. The line feature material may include an embedded electronic component. The embedded electronic component may include an led. The embedded electronic component may include an antenna. The antenna may lay at the surface of the line feature material.

In other implementations the line feature material may include a heat sensitive adhesive. A surface of the line feature material may be painted by the mobile additive manufacturing robot as part of placing the line feature material upon the roadway. The line feature material may include an embedded wire. The line feature material may include an embedded electronic component. The embedded electronic component may include an led. The embedded electronic component may include an antenna. The antenna lies at the surface of the line feature material. The mobile additive manufacturing robot forms a channel into the roadway into which the line feature material is placed. The line feature material may include an embedded electronic component. The embedded electronic component may include an led. The embedded electronic component may include an antenna. The LED feature may be used to control the appearance and meaning of a line feature such as being either a solid yellow line or a dashed white line as non-limiting examples.

BRIEF DESCRIPTION OF THE DRAWINGS

The accompanying drawings, that are incorporated in and constitute a part of this specification, illustrate several examples of the invention and, together with the description, serve to explain the principles of the invention:

FIG. 15 illustrates an exemplary roadway with features requiring repair processing.

FIG. 16A illustrates exemplary methods related to repair of exemplary pot hole type road defects.

FIG. 16B illustrates exemplary methods related to repair of exemplary crack type road defects.

FIG. 17 illustrates an exemplary roadway in concert with an exemplary transportation vehicle capable of interacting with the advanced roadway in similar fashion to those capabilities employed by Addibots used in roadway construction and repair.

FIG. 18 illustrates exemplary methods related to various examples of Addibots.

FIGS. 19A-19F illustrate exemplary methods of adding line features to roadways and aspects of such features.

DETAILED DESCRIPTION OF PREFERRED EXAMPLES

The present disclosure relates to methods and apparatus for mobile automated additive manufacturing. As used herein, "mobile automated additive manufacturing" may include control of locomotion of an additive manufacturing apparatus over a surface free of tracks or rails.

Figure 1:
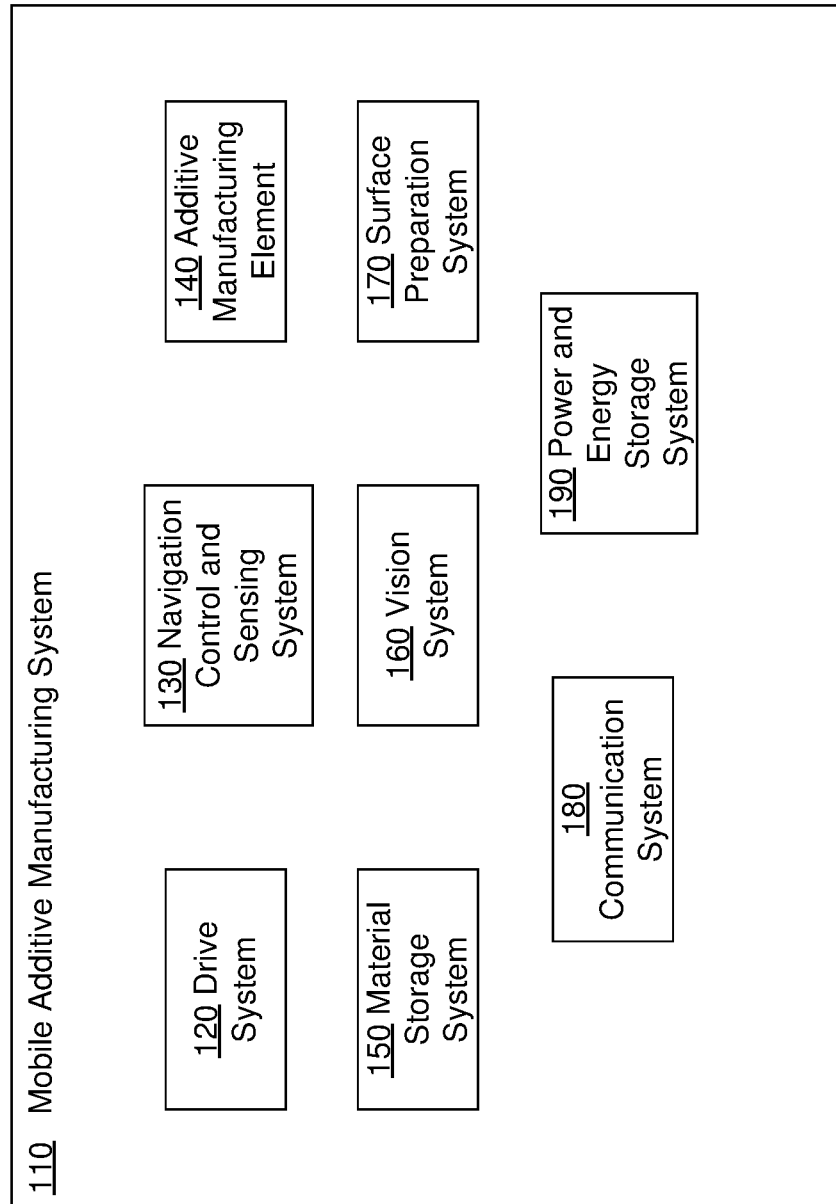
FIG. 1 illustrates a block diagram of the exemplary general components of a mobile automated additive manufacturing apparatus.

Referring to FIG. 1, 100, some elements of an exemplary mobile additive manufacturing system (110) may be found. The system may have a drive system 120 enabling transportation of the manufacturing system over a surface. The drive system 120 may function to move the apparatus on both flat and shaped or curved topography. The drive system 120 may function on wheels, balls, tracks or other means of conveyance known in the art. In some examples, the use of automotive or truck frames either with trailers or with modification directly to the frame itself may be used. The drive system 120 may incorporate a drive mechanism comprising an engine or motor that may act upon the conveyance elements such as wheels or may utilize transmissions and axles to drive the conveyance elements. Various forms of directional or steering control may be possible. In some examples, the differential control of multiple motors acting upon conveyance elements may allow for directional control. In other examples, the directional control may function by a steering system that moves the conveyance elements in ways other than in its drive sense.

The mobile additive manufacturing system 110 may include a Navigation, Control and Sensing system 130 that may function to determine a current location to a desired degree of accuracy as well as an orientation of the device at that location. Such information may be useful in regulating direction control through the navigation system and in determining other control variables such as speed. The sensing system may provide other environmental information to the control system such as temperature and humidity at the location and in some examples at a surface beneath the location of the system. In addition, the sensor and navigation elements may also function to provide awareness of obstacles in the environment of the mobile additive manufacturing apparatus. A separate vision, measurement and inspection system may be present in some examples (a following discussion discusses this in detail) and may interface with the control elements or sensing elements. The control elements may receive data in various forms and may process the data utilizing computational hardware and programing algorithms. The processing may produce control signals to engage the mobile additive manufacturing apparatus to produce an environmental change such as adding material of various forms to create three dimensional surface characteristics such as a flat surface, a surface of defined topography or a surface where defects of various types are affected with the addition of material. In other examples, the addition of material may be used to create an image or another functional aspect such as a slip resistive coating or a tread cleaning function as examples.

The navigation element may utilize various protocols to generate location awareness. For example, the element may utilize GPS technology. In other examples, a local transceiver network may provide telemetry local relative location awareness through the use of RF systems, or light based systems such as a laser based system This local system may function within an outdoor region or alternatively be set up to function within a building. Cell phone based telemetry, and other schemes such as seismic location detection may provide information for telemetry. In some examples, the navigation element may provide a first order telemetry to an accuracy required to control movement of the apparatus, for example. The vision system (to be discussed) or other sensing elements may provide a next higher accuracy for calibration of location. Location marks may be present upon or within the surface and a sensor such as a camera system, for example, may pick up the location marks to calibrate the navigation system and the control system. Various other reference elements such as physically defined lines, such as found on roads or parking lots may be a type of navigation control system. Still further examples may involve the embedding of conductive wires to create a navigation information system. A grid of such conductive wires may create a calibrated work floor with a good deal of accuracy. In still further examples, the surface to be acted on by the mobile additive manufacturing apparatus may be a temporary surface that may itself be moved. Sheets of a temporary material may function as the surface and these sheets as well may include coloration and/or physical elements such as embedded conductors to provide a telemetry signal for the navigation element.

The Navigation, Control and Sensing system 130 may function to define a path that the mobile additive manufacturing apparatus follows in its process. In other examples, the path itself may be figured into the design of a desired topography. For example, in some examples it may be necessary for the mobile additive manufacturing apparatus (Addibot) to travel along a road surface and perform additive manufacturing based on aspects that it measures or determines of the surface as it travels. In other examples, the shape of a feature to be deposited across a surface may involve the control of the navigation system to move the Addibot to a location where the additive manufacturing element can further control the additive process. In these cases, the path of the Addibot could be arbitrarily complex based on a model that it follows to generate an end result.

Referring now again to FIG. 1, an additive manufacturing element 140 may be represented. The various techniques known in the art may be included as an additive manufacturing element including, for example, extrusion heads, stereolithography processing heads and material printing heads. An altered version of stereolithography may occur by the application of thin films of liquid material upon the surface which is then subsequently processed to create hardened surfaces. If the unreacted material is removed a subsequent application of liquid reactant can begin to build the next layer.

The material printing heads may have a wide diversity in characteristics. Printing heads with very fine resolution may be utilized. In other examples larger volumes of material may be printed with heads that have gross resolution. As an example, a printing head may have rows of print heads that have an orifice size such that a roughly millimeter sized droplet may be formed. Such a droplet may have a volume of roughly 10-100,000 times that of a droplet from a 1:1000 resolution. The volume of a millimeter diameter droplet may have an estimated volume of about 0.4 microliters.

In some examples, the additive process can relate to an element such as a print head depositing droplets of material over the surface to build structure. In stereolithography, an energy source is used to convert the liquid to a solidified material, but in these other examples, the droplets of material may either react with the surface or solidify by other principals such as by cooling for example. Combinations of droplets of different material may also result in reactions that result in solidified material.

The additive manufacturing element may also function to add material that changes color or pattern or other physical properties in select regions. A version of this type of additive manufacturing may occur when powders are deposited in the additive process. The powder may create lines or other demarcations. In some of these examples, a subsequent sealing of the powder form may be deposited by another additive manufacturing process.

In some examples, the additive manufacturing element may be an energy source such as a laser, ion beam or the like. The energy source may be used to cause liquid material to solidify in defined regions. The liquid material may be added by the Addibot or be present by other means. As an example, an Addibot may ride upon a transparent surface that may sit above a liquid reservoir of relatively arbitrary size. An Addibot with a laser may ride upon the transparent surface and irradiate the surface layer of the reservoir in desired locations. After a layer is processed, the work material beneath the transparent surface may be moved away from the transparent surface by a layer thickness and the Addibot may again move around on the transparent surface irradiating through the surface to image polymerizable material beneath.

The various additive manufacturing elements that may be used in these manners comprise the art that is consistent with mobile automated additive manufacturing.

An additive manufacturing element 140 may be part of the mobile additive manufacturing system. There may be numerous types of additive manufacturing elements consistent with this type of system. For example, in some examples, the material to be added may be found in a liquid form either in its nascent form or in a processed form. The liquid material may be processed by droplet ejection printing schemes. Some printing elements may be comprised of MEMS jet printing elements. In other examples, the printing element may be composed of an array of valves that open and close to dispense controlled amounts of the liquid. In still further examples, a liquid stream may be controlled by the presence of mechanical shunts which do not allow a stream of the liquid to be released below the element. In fact any liquid control mechanism, typically deployed in an array of elements, which may allow for a spatial control over the dispensing of the material, may comprise an additive manufacturing element for liquids in a mobile additive manufacturing system In FIG. 1, a material storage system 150 may be found. As has been described there may be numerous types and forms of material that may be processed by an Addibot. In some examples, materials in filament form may be used; in other examples liquids of various kinds may be employed. And, in still further examples, solids such as powder form materials may be utilized. In each of these cases, there may be numerous material options within a particular kind. There may be standard ABS plastic filaments or other plastic filaments. In some examples, other fibers such as fiber class filaments may be utilized in composite processing such as with epoxy resin combinations with fiberglass filaments. In the liquid form a great diversity of materials may be used including resins, photoactive and thermo active materials. Other materials in the liquid form may be a solid at an ambient condition but may be processed by the additive manufacturing system at conditions that make the material liquid. The powder form examples may be thermo-active and photoactive materials or alternatively may be materials that in combination with other deposited materials cause a reaction to occur resulting in a deposited solid material. In the state of the art, metals, insulators and ceramics to name a few materials may be formed by the processing of powder form materials. In other examples, the powder deposited will remain in a powder form on the surface.

In the various materials examples that may be possible with an Addibot, the environmental storage conditions on the Addibot may be important. Accordingly the material storage system 150 may have controls over numerous environmental conditions such as the temperature of the material storage, the pressure, the ambient gasses or a vacuum condition and the humidity to mention some examples. Thus, the material storage system for an Addibot would have control systems for the important environmental conditions. The storage system would need to allow for the automated or non-automated replenishment or replacement of the material that is located in an Addibot. In some examples various combinations of multiple material storage systems may be present. For example, a powder storage system and an additive manufacturing element for powder forms may be combined with a liquid storage system and an additive manufacturing element for liquid forms upon the same Addibot system. In still further alternative, two different forms of material may be combined with different storage systems that feed a single additive manufacturing element that is designed to simultaneously process the two material types.

Other examples may have additive manufacturing elements to disperse solids. The element may extrude elements of material that may be gelled to allow for the material to be formed by the additive manufacturing head. The extrusion elements may also deposit small pieces of extruded material that is in a gelled or partially melted form. Lasers or other high energy sources may cut the small pieces from the extrusion print head as it is being extruded. In other examples, the material is not cut as it is formed into three dimensional shapes.

Solids may also be dispersed in powder forms. The powder may be carried in a solvent as an emulsion that may be dispersed in manners that liquids may be dispersed. In other examples, the powders may be controlled by valves or shunts as it is dropped or impelled onto the surface.

The various materials that are added to the surface may be further treated to form a solidified surface. In some cases materials may be treated with light or other energy to heat or otherwise react the materials to form a solidified result. In other cases a chemical reaction may be caused to occur by the addition of a second material. In such cases the additive manufacturing element may be comprised of control elements to disperse liquids and solids or multiple liquids. In addition, the system may include the elements to post process the material such as by thermal or photochemical action. These post processing elements may be located on the additive manufacturing element, or may be located in other portions of the system. In some examples, the post processing may also include processes to wash or clear the surface from materials that are not solidified, adhered or attached to the surface. These processes may include processing to remove solid, powder or liquid material remaining on the work surface such as vacuuming or sweeping. The removed material may be recycled into the material storage system or may be moved to a waste receptacle. In similar fashion the post processing steps to remove material may be performed by elements that are included on the additive manufacturing element or additionally be other elements that are included in the mobile additive manufacturing system.

The results of the various additive processes may be measured by various manners to verify the conformity of the result to a modeled surface topography. An inspection system or a vision system 160 may perform these measurements to control the results. In some examples, the surface may also be studied with a similar or identical metrology element to determine the presence of topography. Another way of looking at such a measurement before the additive manufacturing step may be to examine the surface for defects, cracks or fissures that may need to be processed to form a flat surface for example. Therefore, the vision system 160 may in fact occur multiple times in the system. A pre-measurement may be performed by a first measurement element and a post processing measurement may be performed by a second measurement element. There may be numerous manners to measure the surface topography. As an example, a light or laser based metrology system may scan the surface and analyze the angle of reflected or scattered light to determine topography. Similar scanning systems based on other incident energy like sound or electromagnetic signals outside the visible spectrum like infrared or UV radiation, for example, may be used.

A different type of metrology system may result from profilometry where an array of sensing elements may be pulled across the surface and be deflected by moving over changes in topography of the surface. An array of deflecting needles or stylus may be dragged over the surface. In an alternative example, a pressure sensitive surface may be pulled over the surface under study.

The surface that the mobile automated additive manufacturing system acts on may have movable defects that exist on it. This may be commonly classified as dust or dirt for example. An element for preparation of the surface 170 may be located in an Addibot. In some cases, the material may be removed by a sweeping or vacuuming process that moves the particles into a region that removes them from the surface. Other methods of removal, which may replace or supplement the sweeping or vacuuming, may include pressurized gas processing which may "blow" the surfaces clean. There may also be electrostatic processes which charge the particles with electric charges and subsequently attract them to charged plates which attract the particles away. A cleansing process may also comprise a solvent based cleaning process which may subsequently be removed in manners mentioned earlier, in a combination of the Addibot techniques. A first Addibot may function to pretreat a surface in a variety of manners while a second Addibot performs a topography altering additive manufacturing process.

Another element, a communication system 180, of the mobile additive manufacturing system may be found referring to FIG. 1. In general, Addibots may be used in combinations to perform functions. To effectively perform their function it may be important that the Addibots may be able to communicate with each other. The communication system may also be useful for communication between the Addibot and a fixed communication system. The fixed communication system may be useful for communicating various data to the Addibot as well as receiving data transmissions from the Addibot. The data transferred to the Addibot may include programming software or environmental target files or the data may include environmental data such as mapping data or topological data as examples. The communication may be carried by RF transmission protocols of various kinds including cellular protocols, Bluetooth protocols and other RF communication protocols. The communication may also utilize other means of data transfer including transmissions of other electromagnetic frequencies such as infrared and optical transmissions. Sound waves may be useful for both communication and spatial mapping of the environment of the Addibot. In some examples the Addibot may be tethered to at least a communication wire that may be useful for data transmission.

Another form of communication may relate to visual based information conveyed by the Addibot body itself. In some examples, the Addibot body may include a display screen to communicate information to the surroundings in the form of graphic or visual data. As an example, the display can warn people in the environment of the Addibot as to the function that the Addibot is performing and when and to where it may move. Audio signaling may comprise part of the communication system in addition. As well, the Addibot may be configured with a light system that can project visual signals such as laser patterns, for example.

The communication system may be useful to allow external operators to provide direction to the Addibot. The directions may include the control of navigation in both a real time and a projective sense. Users may utilize the communication system to provide activation and deactivation signals. Numerous other functional control aspects may be communicated to control operation of the Addibot other than just the transfer of software programs including for example activation and control of the various subsystems.

A Power and Energy storage element 190 may be found within the mobile additive manufacturing system. In some examples, an Addibot will be tethered with a wire. The wire may be used for a number of purposes including providing power to the Addibot drive system or to an energy storage system within the Addibot. In many examples, the Addibot will operate in a wireless configuration, and therefore, will contain its own power system in the mobile platform. Standard combustion engines and hydrocarbon fuels may comprise a power system along with a generator driven by the engine to charge batteries as an electric charging system. In other examples, a battery powered system may power both the drive system with electric motors as well as the electronics and other systems. The battery storage system may be recharged during periods of non-use and the components of such a recharging system may comprise portions of the power and energy storage element. In some examples where the Addibot operates in an automated fashion, the recharging of the energy storage element may also occur in an autonomous fashion whether it is recharging electrically or obtaining additional fuel stores.

There may be numerous manners to configure the novel mobile additive manufacturing system that has been described. In the following examples, non-limiting examples are provided as examples of the different manners that the Addibot apparatus type may be utilized.

Ice Surface Treatment—Water Printing

One manner that an Addibot may be configured to perform is processing that observes a local surface topography and adds material to make the surface more flat. Cracks, fissures, divots and other local changes to a surface flatness may also be processed by adding an appropriate material either to fill in the cracks and fissure or otherwise reshape the surface topography. Ice surfaces that are skated upon are a type of surface treatment need that such processing may be relevant to. Skating creates fissures and divots that overtime become a difficult surface to skate upon. The state of the art processing to create a resurfaced ice surface utilizes large driven machines that contain a cutting device that cuts the surface of the ice to a depth that generally removes the imperfections. A flooding layer of water is then applied to allow for the surface to be rebuilt to a flat surface height. The added water both repairs the surface topography and also overtime replaces water that may have left the ice surface by sublimation.

Ice resurfacing provides an example for types of Addibots that add material to surface to shape it or repair it. The generality of this type of Addibot should not be limited by the specific aspects of such an apparatus when defined as an ice repair Addibot. Therefore, the inventive art is intended to embrace such alterations in defining novel mobile additive manufacturing apparatus.

An Addibot may provide an alternative method to repair an ice surface. By controlling the deposition of water by additive manufacturing processes the necessary amount of water to fill in defects in the surface may be applied. An additive manufacturing element for water, in some examples, may comprise a MEMS controlled print head that is traversed above an ice surface at a close height. The droplet size may assume various dimensions depending on the nature of the additive manufacturing element. In some examples, the print head may eject droplets of controllable sizes that are roughly in a range around a millimeter in dimension. Other processes may utilize print heads that form droplets that are a tenth or a few hundredths of a millimeter in dimension or alternatively may range to 10 millimeters or more. An image of the surface may be compared against a desired topography and a difference may be calculated which may drive the amount of material deposited at a location by the additive manufacturing element.

The temperature of the deposited water may be controlled to be near or at the freezing point of water. In some examples, the water may be super cooled such that it still exists as a liquid but may solidify upon interaction with the surface. In some examples multiple additive elements may be utilized to deposit water under different conditions such as for example at a higher temperature such that in a second additive process the droplets have additional time to flow before they solidify. There may be numerous processing conditions that may be controlled in the deposition of water onto an ice surface.

In some examples, such as ice surfaces for general recreational skating and ice related sports such as ice hockey and figure skating, the surface of the ice may be desirably formed into a planar flat surface. In other examples, such as may be used in treating the surface for speed skating, there may be a need to condition the ice surface to be locally flat but to have different planar orientations along the course of the ice surface or in some examples may even have more complex shapes that planar.

Figure 2:
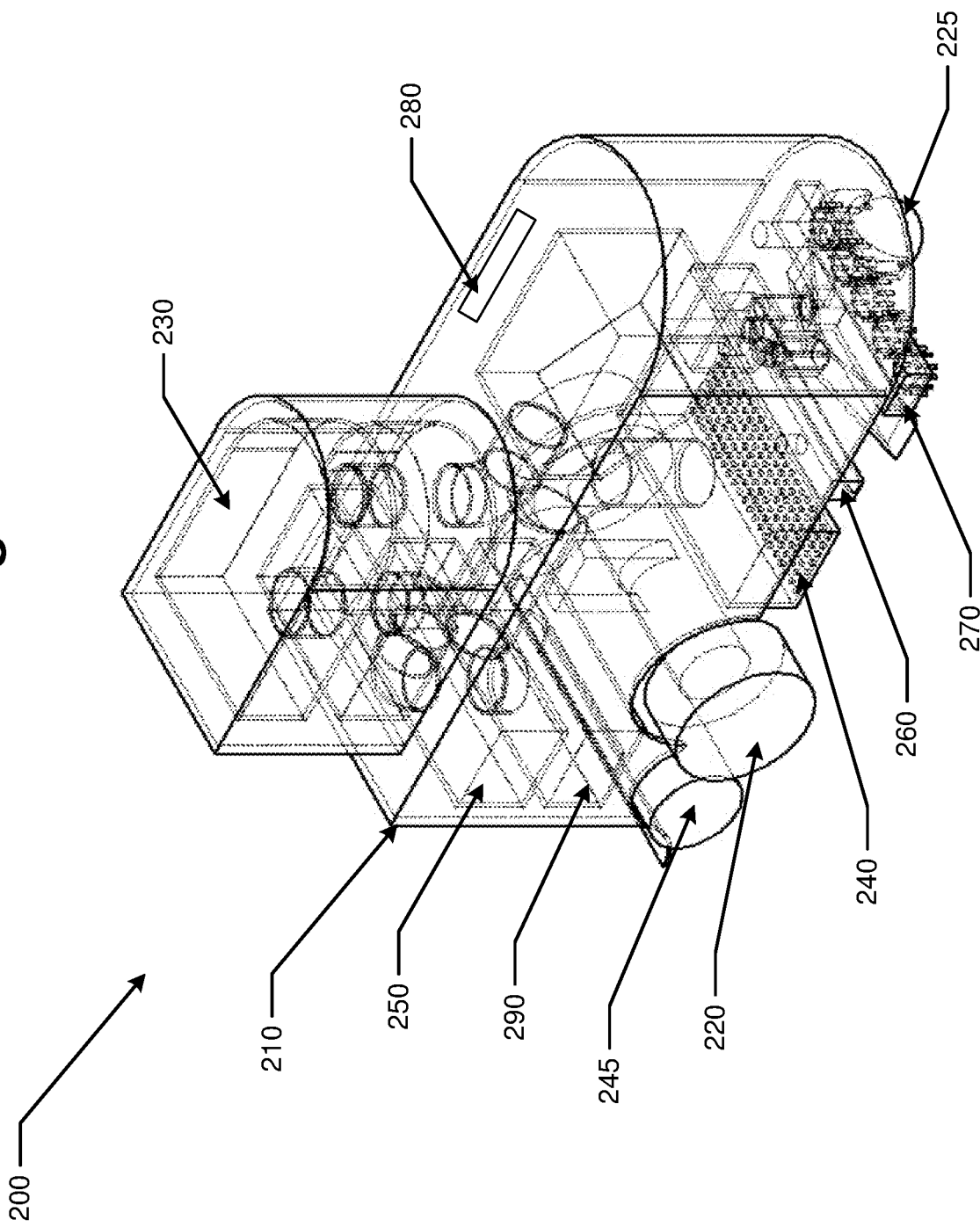
FIG. 2 illustrates a perspective view of an exemplary Addibot that may be useful for Ice Surface Treatment.

Referring to FIG. 2, 200 an example of an Addibot configured for Ice Resurfacing may be found. The chassis 210 of the Addibot may contain and support the systems of the Addibot in a mobile and autonomous manner.

The drive system 220, and drive flexible wheel 225 of this example may be exhibited. The depiction provides an example of one possible drive system using three wheels. An example using 4 or a different number of wheels may also be within the scope of the inventive art herein. The drive system may be constructed, though, in a manner in which it does not interact with the other Addibot systems, for example, the vision system or the additive manufacturing element system. Depending on how the wheels of the drive system 220 are powered, they may also be part of the navigation, control and sensing system. Based on the input from the vision system (as a part of the navigation control and sensing system) the wheels may direct the Addibot to its desired path, in a fashion that is either autonomous or predetermined, depending on the orientation and number of the wheels.

A sensing element 230 may be depicted. This element may be used to perform functions necessary in the navigation, control and sensing system for this example. The navigation functions could be performed through GPS, an element grid, or other manners as has been described relating Navigation, Control and Sensing system 130 of FIG. 1.

An additive manufacturing element 240, and a secondary additive manufacturing element 245 for this example may be shown. The additive manufacturing element 240, for this example, may be a material printing head, as described in reference to the additive manufacturing element of FIG. 1, which may dispense water droplets of a controlled size, as well as a controlled temperature (which may be controlled by the material storage systems). This element may function to execute a precise additive process of the material, based on input from the vision system. Another element, in this example, the secondary additive manufacturing element 245 may be a roller or other type of distribution apparatus that spreads or smoothens to a degree material that was added to the surface.

Elements of a material storage system 250 of this example are shown. These components may comprise various elements that may be necessary for material storage within an Addibot. There may be numerous alternative designs and orientations of components that may be consistent with the function of an Addibot. For this example, it may be important to include a surface material collection element which may be in part be filled from material outputted by the surface preparation system. A temperature controlled portion of the surface material processing element may be used to melt collected ice. Filtration or screening components may be used to filter out any undesired particles that may be collected in during the process of the Addibot. A primary material reservoir where water or water based mixtures may be contained, may be filled by an operator of the Addibot apparatus. Recirculation of melted ice collected during the surface preparation may also be directed to the primary reservoir. An environmentally controlled secondary material reservoir may also be used to keep water or water mixtures at a different storage condition than that used in the primary storage location, such as the temperature, pressure or other characteristic of the material. The filter system used in the surface material processing element could be any combination of ionizing plates, sieves, or other common filtration devices. These devices may be necessary for removing particles that may contaminate or otherwise interfere with the correct operation of the Addibot.

A vision system 260 for this example may be depicted as shown. This element may use a variety of methods such as those described in reference to vision system 160 of FIG. 1. These may include a laser scanner, sensitive extruding pins or brushes, or such components as may allow for inspection of the surface to be process or for determination of the topography of the surface. Alternative orientations may be possible including for example an orientation where a vision system may be placed behind the additive manufacturing element to perform a post-inspection of the surface, after the material has been applied. Among other purposes, the inspection may be used to verify the results of the addition process and to see if more or less material may need to be added.

A surface preparation system 270 for this example may be observed. In this example, it may be necessary to remove ice particles, snow, dust, debris or dirt from the ice surface before it may impede the accuracy of the vision system in processing the surface topography. The elements shown in FIG. 2 may include a brushing system, a vacuum system, and a scraping system or a combination of these. These systems may be used to remove undesired particles from the surface. Other particle removal systems, including ionizing plates, a sweeping broom, or other brush based devices, other types of vacuums or suction devices; high pressure gas treatments to blow surface debris into a collection region, among other systems may also be usable for this example of an Addibot.

A communication system element 280 for this example may be seen. This element may be used to carry out communication processes, either between other Addibots or an external user. These tasks may be carried out in manners consistent with methods described in reference to the communication system 180 of FIG. 1.

A power and energy storage system 290 may be depicted. This element may be a battery to power the example's electrical systems and motors, or a combustion engine to power the drive system which may also charge a battery system as non-limiting examples. The power system may provide mechanical energy to the drive system or may provide electrical energy to the drive system which may power engines that comprise portions of the drive system. Electrical energy from generators connected to combustion engines or from battery sources may be used to power substantially all of the electronic systems utilized throughout an Addibot. Other energy storage sources such as compressed air may also comprise acceptable solutions for energizing the operations of an Addibot.

In the example of ice surface treatment, the Addibot will typically perform processing on surfaces that are predominantly flat. While some Addibot designs may include frame adjustments and specialized drive systems to support movement over terrain such as the schemes used for extraterrestrial robotics, an ice resurfacing Addibot may have different challenges for the drive system since the wheels need to accurately grip the ice surface without changing it. Specialized drive systems may be useful for many different Addibot design types.

The path that an ice resurfacing Addibot takes in the process of performing its function may be another example of a specialized aspect of these examples of Addibots. An ice rink or speed skating track may be physically located in a fixed location. Therefore, the relative path that an Addibot may traverse may be predefined or taught to the Addibot and replayed at later times. The control of the paths may also be programmed based on the types of use that the ice surface is exposed to. For example, an ice hockey game may have high use in goal creases, face off circles and such. The same ice surface may have a different use pattern after figure skating events, and such patterns could be flexibly programmed.

Furthermore, during sporting events an ice resurfacing Addibot may not only function to resurface the ice but also utilize display components on its body to provide visual information as it moves on an ice surface such as pictorial displays and laser light shows as non-limiting examples. In such examples, the path of the Addibot may also be altered to complement the non-resurfacing aspects.

In the performance of ice resurfacing, especially during sporting events, the rate at which the ice surface is processed may be complemented by the concerted processing of multiple Addibots. It may be likely in some examples that a team of five to ten Addibots may process the ice surface during an intermission. In these cases the Addibots may need to accurately communicate and sense the presence of other Addibots. In some of these examples, the concerted action may also involve processing by an external processing device that communicates with and to the Addibots. Proximity sensors in the communication or other sensing components may operate as well to establish the presence of obstacles such as other Addibots or humans or other such obstacles that may be present on an ice surface.

Communication to the control systems may be performed by wireless communication protocols such as Wi-Fi, Bluetooth, cellular communication protocols such as gsm, CDMA for example, and operate on different communication channels and frequencies as have been discussed. Additionally, Addibots of various types may also comprise connections for wired communication and also display screens and input/output devices to allow operators to provide control signals, data transmission and other interaction with the Addibot.

The various systems of Addibots may necessarily utilize materials or other commodities such as energy during the course of processing. The material storage systems may interact with fixed units that may refill them or they may be filled by operators in a manual fashion. In the example of an ice resurfacing Addibot the material storage system may be refilled with water for example.

In examples that utilize batteries as a power source, the batteries may be powered at a charging station. The interaction of the Addibot with a charging station may be performed in an autonomous fashion where the Addibot moves itself into a proper location to interface with the charging station. Alternatively, an operator may interact with the Addibot and connect it with a charging system.

Figure 3:
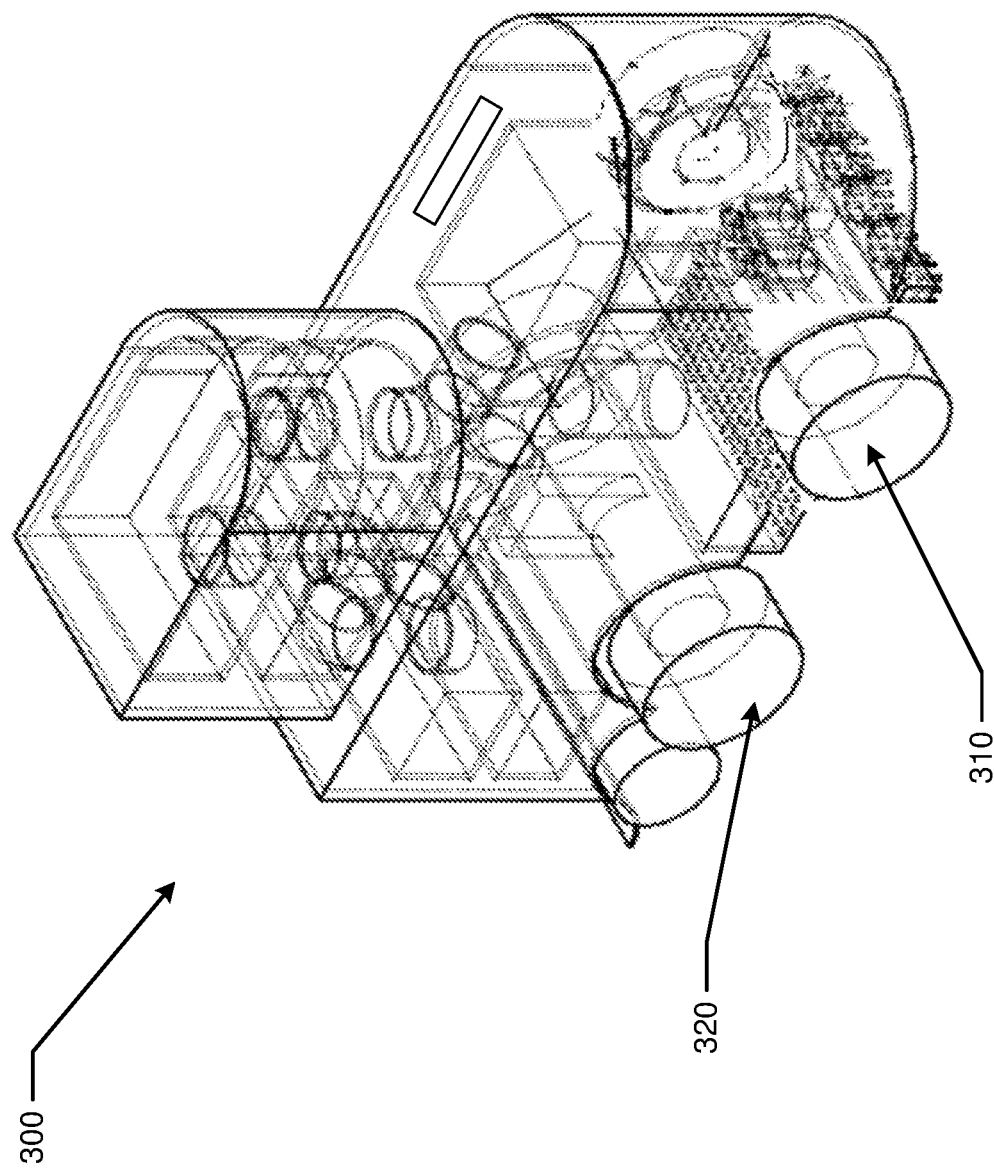
FIG. 3 illustrates a perspective view of an alternative example of an Addibot with a drive system that may allow for the non-interaction of the drive components with a surface under processing.

Referring to FIG. 3, 300 an alternative example of an Addibot with a different drive system type may be found. In some examples, the wheels of an Addibot may be configured to be parallel to each other on two sides of the Addibot. This means that there may be a rear drive system 310 and a forward drive system 320. The design allows for less chance for features to be interacted with by the drive system as the Addibot moves in forward or reverse directions.

Other Examples of Addibots or Methods of Use of Addibots

Additive Manufacturing of Powders—Sports Field Maintenance

The material that is additively processed by an Addibot may include powdered forms. In some examples, the powdered form may perform a function without further processing, such as may be the case for an example Addibot that is utilized for depositing lines of material such as chalk upon a sports playing field. In other examples, the powder may be further processed to result in an added material to the processed surface. A chemical in a liquid form may be applied by the same Addibot or an additional Addibot or in some examples by another apparatus. The chemical may cause a reaction to occur resulting in a hardened or solidified material being present upon the portion of the surface that had added powder processed. The further processing of the powder may include treatment with a source of energy, such as a sintering application that may be applied by laser irradiation or other thermal processing apparatus. In other examples, exposure to an energy source such as a lamp source may cause the powder to undergo a photo induced reaction to result in a solidified, hardened or attached material upon the surface that the powder was deposited. Other powdered materials or mixtures of powder materials may be deposited by an Addibot in an additive manufacturing process.

Road Surface Maintenance—Cracks and Paint Lines

A surface may be treated by an Addibot to add material to determined regions for the purpose of creating a new surface topography. In some examples, the regions where material is added may be defective regions of the surface that may result from cracking of the material that makes up the surface or other processes that may result in surface defects. The defects may be observed by a vision system located upon an Addibot or on another apparatus that communicates with the Addibot. The observations may result in a mapping of surface regions that material should be added to. In some examples, such as where the surface map may represent defects in a road surface; liquids, powders, agglomerates or other mixtures of solids and liquids may be deposited by the Addibot into the regions highlighted by the mapping.

Figure 4:
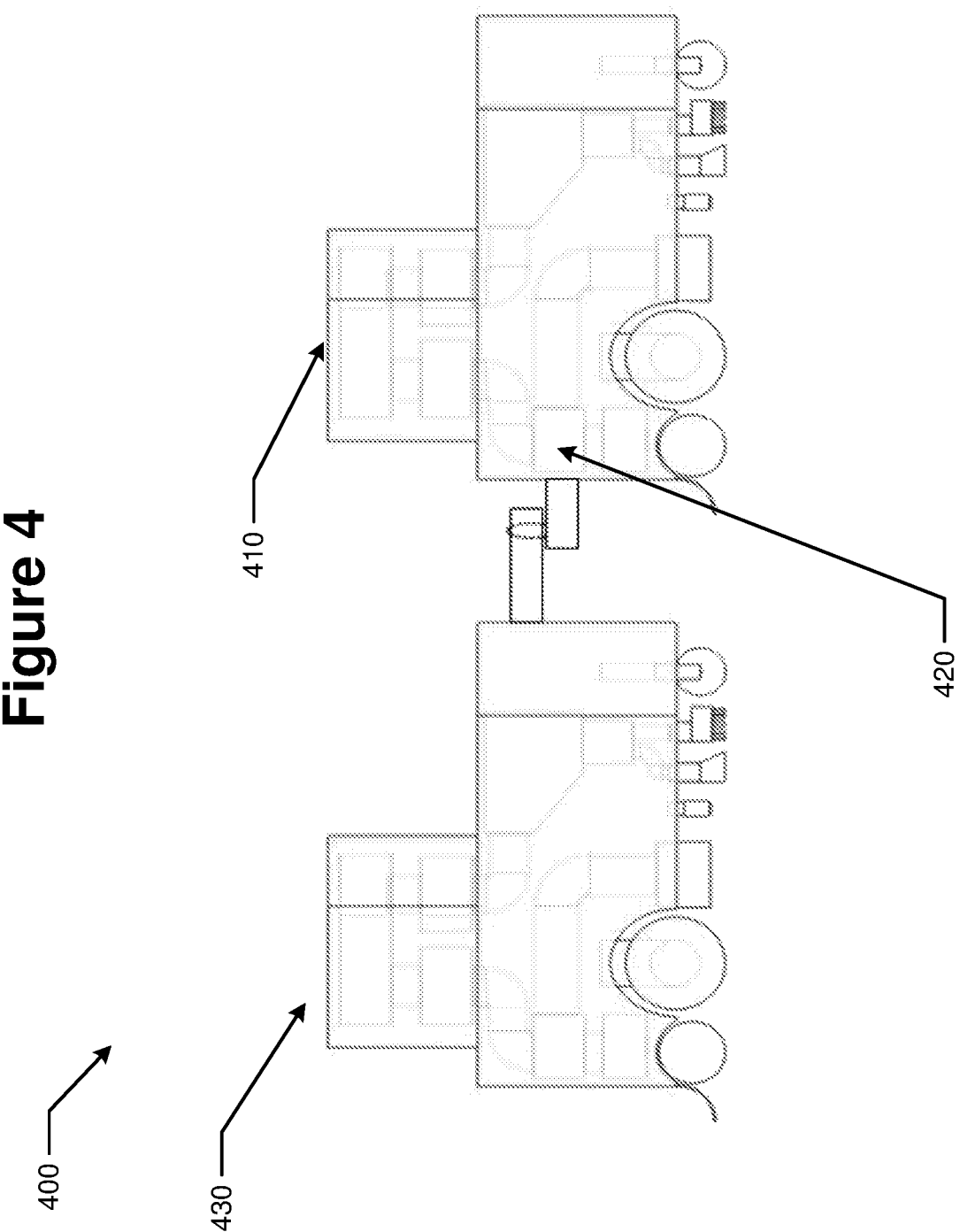
FIG. 4 illustrates an exemplary depiction of an Addibot that is connected to a front drive system as a trailer.

In examples where the location of added material is provided to the Addibot a calibration process may be performed at one or more locations during the course of the operation of the Addibot. In some examples, an alignment feature such as a printed mark which may be a cross or verniers for example may be place upon the surface by the apparatus performing the observation of the defectiveness. The vision system of the Addibot may then function to observe the alignment marks and use them to orient and calibrate its location and movements relative to the map space. In some examples, such as that depicted in FIG. 4, 400 an Addibot may be pulled behind a drive system in a trailer fashion. A first Addibot 410 may be connected to Addibot 420 by a hitch system 430.

Large Piece Manufacturing—Boat Hull

Figure 5:
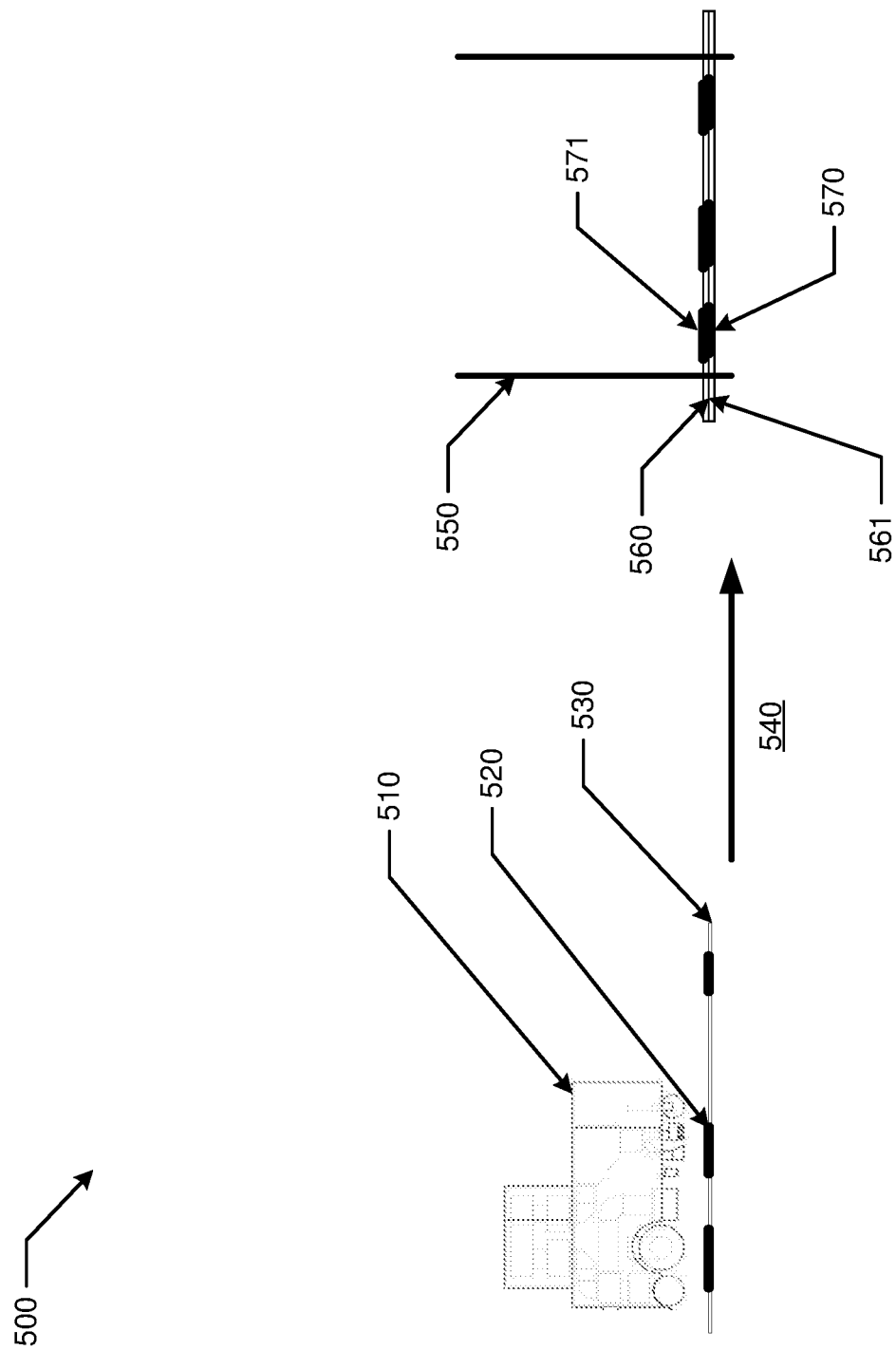
FIG. 5 illustrates an exemplary Addibot design for traversing and treating surfaces with large height components.

As depicted in FIG. 5, 500 a mobile additive manufacturing apparatus such as an Addibot may be useful in producing large pieces by the performance of mobile additive manufacturing upon a surface in a sheet form. The surface sheets 560, 561 may subsequently be moved into an oriented location 550 to be stacked in an aligned manner. In some examples, the sheets are treated in such a manner that they adhere to the surface that they are moved to. In other examples, the stacked sheets may be treated in a manner that solidifies them together such as heating for example. In such a case, the heating may 5 activate a thermo-epoxy in the sheet to adhere to a deposited layer lying underneath. The sheet material that is not attached to the deposited material may be removed in various manners such as cutting or solvating then. In some examples, channels may be formed in the various additively deposited layers such that adhesive material may be poured through the stacked layers and cause them to consolidate into a strong product such as a boat hull for example. This example may more generally be characterized as an Addibot that functions as a mobile additive manufacturing apparatus by moving an additive manufacturing head that can control material in an x and y plane as well as being translated into a vertical direction. The apparatus may then control deposition that may be represented by x, y coordinates of added material of a thickness z . . . and then the apparatus may subsequently be translated to a new x', y, and z' location for further additive processing. Referring to FIG. 5, defined layer features 570 and 571 may have been printed in the manner shown for Addibot 510 printing features 520 on a sheet 530 before the sheet is moved 540 onto the stacking fixture with oriented location 550. In this manner large products can be formed in thin layers by Addibots and then the sheets can be stacked. In some examples, Addibots may perform the function of moving the sheets with deposited layer features as well.

Surface Topography Forming—Skate Park

Figure 6:
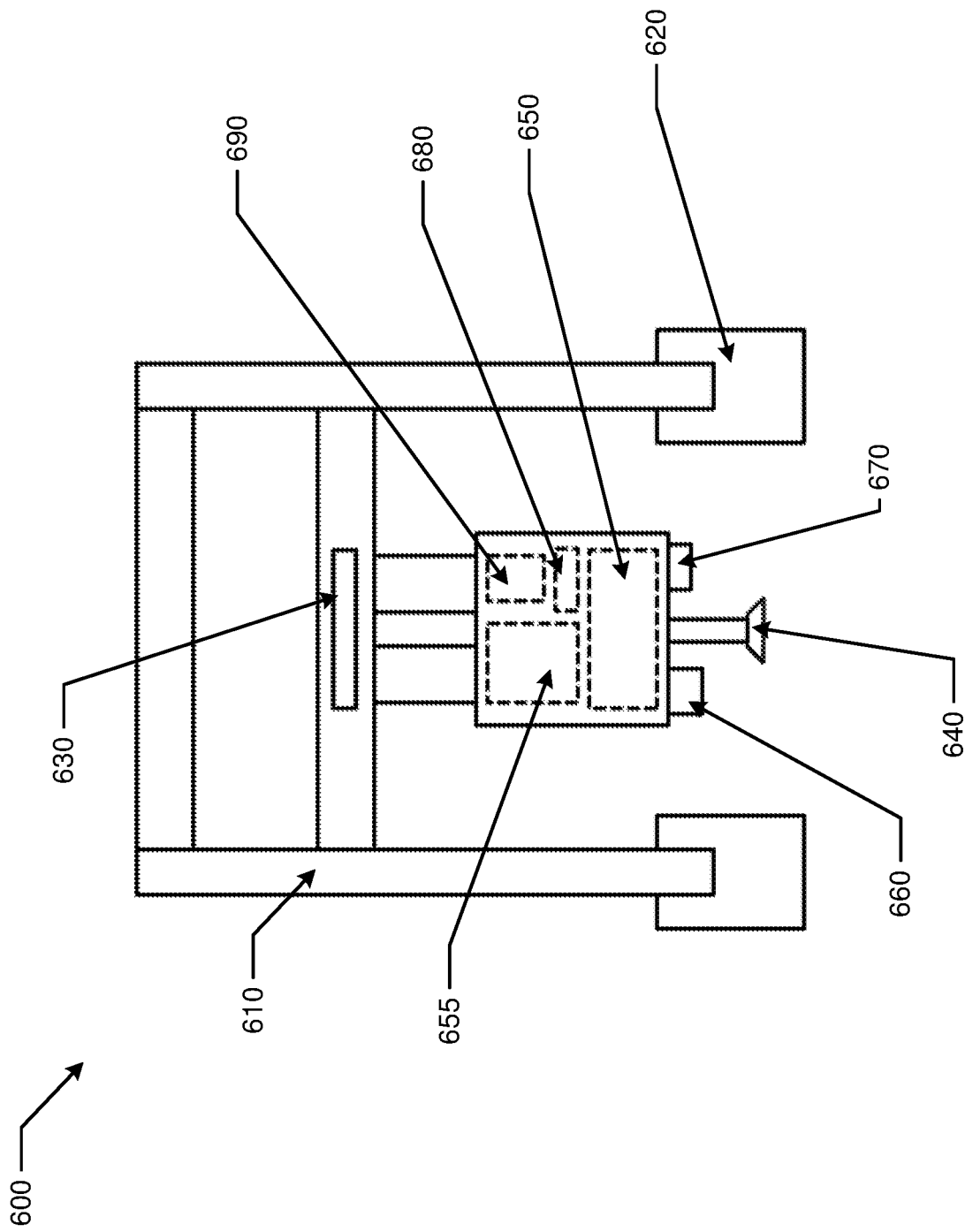
FIG. 6 illustrates an exemplary Addibot in the middle of performing an additive manufacturing build process on the surface of sheets of material which are added together to form a product.

In some examples a composite surface may be formed by the additive deposition of layers to form a support structure for other surface treatments. Layers of solidified material may be deposited by an Addibot apparatus. A subsequent process may coat these layers with a top surface treatment. In an example, a skateboarding park may be formed by the additive deposition of surface material in topographic layers of deposited concrete for example. After curing, a subsequent process such as manual forming may coat the rough surface layer with additional material to create a smoother surface. A large Addibot such as that seen in FIG. 6, 600 may be useful to allow for a large additive manufacturing surface to be treated, as well as allowing significant height that the additive manufacturing element may be located at as layers are added. There may be various components for the large surface additive manufacturing system. The chassis 610 of the Addibot may contain and support the systems of the Addibot in a mobile and autonomous manner. The drive system 620 of this example may be exhibited. A sensing element 630 may be depicted. An additive manufacturing element 640 for this example may be shown. Elements of a material storage system 650 of this example are shown. Elements of a secondary material storage system 655 of this example are also shown. A vision system 660 for this example may be depicted as shown. A surface preparation system 670 for this example may be observed. A communication system element 680 for this example may be seen. A power and energy storage system 690 may also be depicted.

Surface Patterning—Entry Way Flooring

In some examples, an Addibot may add ink or other colorants to a surface under treatment. The Addibot may move a printing head across a surface after being oriented in space in some fashion. In some examples, the orientation may occur by the reading of a surface reference feature such as a cross or verniers. In other examples, a wireless triangulation protocol may be used which in turn functions through the use of radio waves, light waves, infrared or ultraviolet waves, sound waves or other emissions that could be used to triangulate a location. In some examples, GPS protocols or cellular based location protocols may be useful for orientation.

The oriented Addibot may print a colorant pattern across a large surface as it moves in a programmed manner. Such an Addibot may have multiple material storage locations to store different inks with different colors to feed the additive manufacturing element which may in some examples be a MEMS based ink printing head. In some examples, after the printing or other additive manufacturing step that results in coloration, a post processing drying or curing step may be caused to occur by the action of the Addibot or a subsequent apparatus.

After a colored pattern is applied to a surface, it may be desirable to encapsulate the surface treatment with clear treatments of other materials such as clear coat paint, clear latex, urethane or other transparent surfaces. An Addibot may be useful for the programmed additive process of these clear coatings, or another apparatus or person may treat the surface to coat the additively processed surface pattern.

In other versions of these examples, the urethane coating may be applied in a step nearly identical to the printing step. In still further examples, the MEMS printing element may apply very small droplets of colored urethanes or other transparent materials with dyes in them that then both form a surface pattern and also are a resulting surface treatment that is strong enough to be used without further treatment. The more general aspect of a mobile additive manufacturing apparatus may allow for surfaces to be treated in a manner to form a pattern such that the surface may subsequently be moved. For example, wall treatments or signs may be processed at a work site and added to a building as a surface in a different orientation from the orientation as processed. As an example, patterned window coverings or signs may be formed with a process involving such a type of Addibot apparatus.

Organic Surface Treatment—Wood or Stone

In some examples, a surface such as a driveway may be treated with an Addibot that may be configured for programmed deposition on a surface. The Addibot functionality may be particularly useful in patterning the deposition of surface treatments in such a manner that they are not applied where the underlying surface is not, such as for example off the surface of a driveway. In a similar fashion, organic material such as coatings may be applied to other types of surfaces such as decks for example. In some examples, the Addibot may use its vision system to understand where the planks are located and not the seams between them for example. The Addibot may then control its additive manufacturing element to add the organic coatings only in the region that a treatment will fall upon.

Surface Bonding—Rubber Walkway on Concrete

In some examples, an Addibot may add material to intentionally change a surface both in material composition and also in topography. An Addibot may function to print or otherwise deposit liquid compositions that may polymerize in place or otherwise solidify to create a structure that has function. In a non-limiting example, a series of stripes may be deposited on a concrete walkway near an entrance such that the stripes either perform an anti-slip function or a drying function as a person walks above the deposited material. The Addibot device may be used in such a manner when the walkway is first formed or alternatively it may perform a repair function to add more material as it is worn away. The vision system of some Addibots may be particular useful if it measures the topography of the warn added stripes and determines the correct amount of material to additively process onto the surface such that raised stripes of uniform height result.

Adding Solid Material in Mesh Matrix Form Followed by Sealing

In some alternatives an Addibot may add material in solid form to a surface and then subsequently treat the solid added material in spaces between individual pieces. As a non-limiting example an Addibot may place tiles on a surface in prescribed locations. In some examples an adhesive may be deposited onto the surface in appropriate locations for the tiles to be placed into. In other cases, an additive process may deposit adhesives or sealants between tiles after they are placed. The additive manufacturing element in these examples may not deposit droplets or liquids but solid elements at prescribed locations which may then be locked in place as mentioned. Surface topography of such composite surface may then have various properties that may be defined by the solid structures. In some examples, the solids may be ceramics or other insulators, in other examples; they may be metallic in nature. In still further examples wire forms of material may be added to a surface in similar fashion to the extrusion printing of gelled material to form additively produced products. In some examples a metallic wire may be moved by a head and may be affixed in a particular location by a simultaneous additive step for an adhesive as an example. In such a manner a surface may be built from solid materials such as wires which may later be embedded in another surface layer to result in sensors, heating elements or radio frequency transmission elements for example. In a more general sense, the mobile drive system may move an Addibot around a surface while its additive manufacturing element adds solid form material to the surface.

Control Systems

Figure 7:
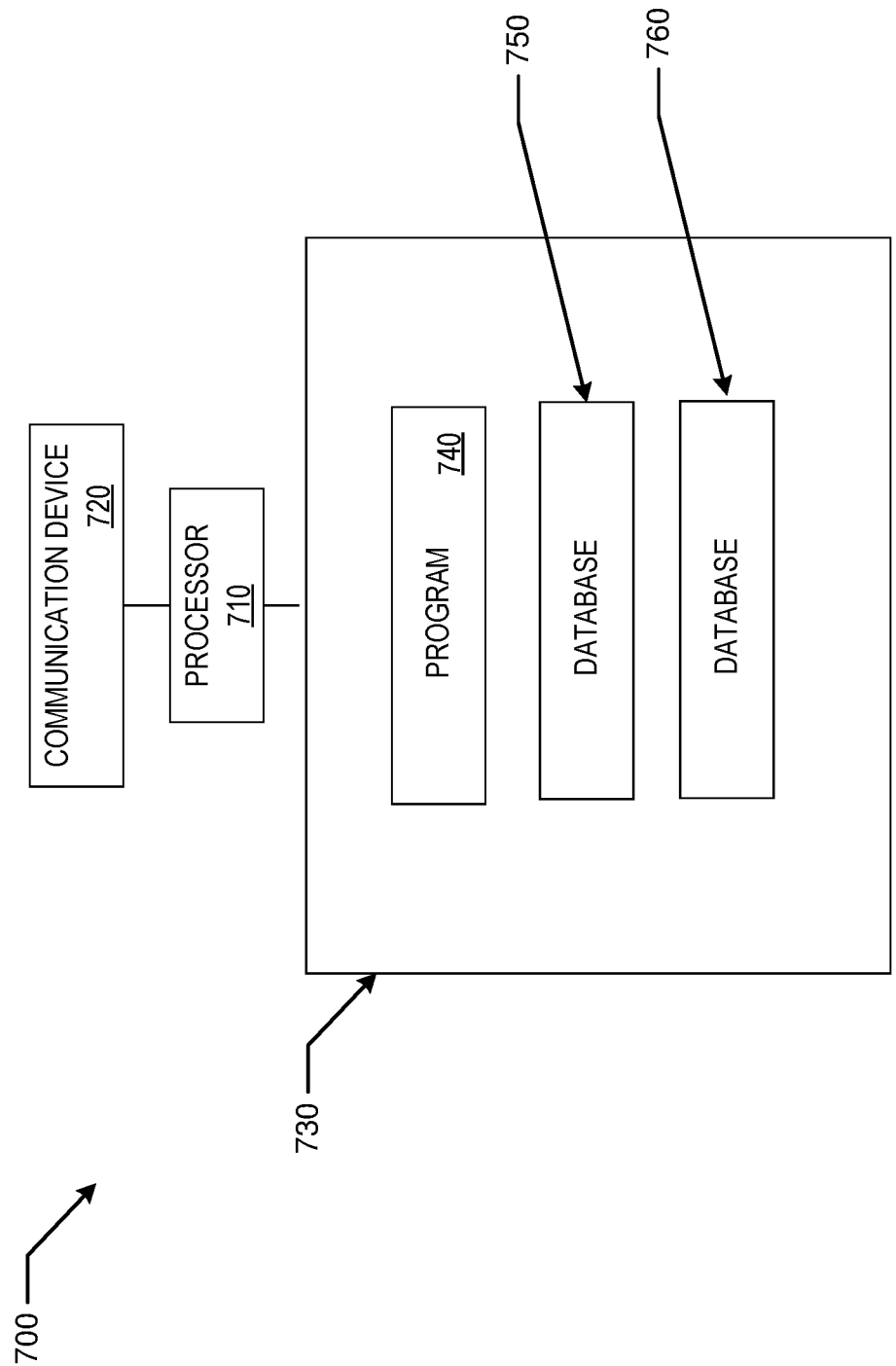
FIG. 7 illustrates a processor and controller that may be useful in various examples of Addibots.

Referring now to FIG. 7, a controller 700 is illustrated that may be used in some examples of a mobile additive manufacturing apparatus. The controller 700 includes a processor 710, which may include one or more processor components. The processor may be coupled to a communication device 720.

The processor 710 may also be in communication with a storage device 730. The storage device 730 may comprise a number of appropriate information storage device types, including combinations of magnetic storage devices including hard disk drives, optical storage devices, and/or semiconductor memory devices such as Flash memory devices, Random Access Memory (RAM) devices and Read Only Memory (ROM) devices.

At 730, the storage device 730 may store a program 740 which may be useful for controlling the processor 710. The processor 710 performs instructions of the program 740 which may affect numerous algorithmic processes and thereby operates in accordance with mobile additive manufacturing equipment. The storage device 730 can also store Addibot related data in one or more databases 750, 760. The databases 750,760 may include specific control logic for controlling the deposition of material at each of the additive manufacturing components which may be organized in matrices, arrays or other collections to form a portion of an additive manufacturing system.

While the disclosure has been described in conjunction with specific examples, it is evident that many alternatives, modifications and variations will be apparent to those skilled in the art in light of the foregoing description. Accordingly, this description is intended to embrace all such alternatives, modifications and variations as fall within its spirit and scope.

Methods

Figure 8:
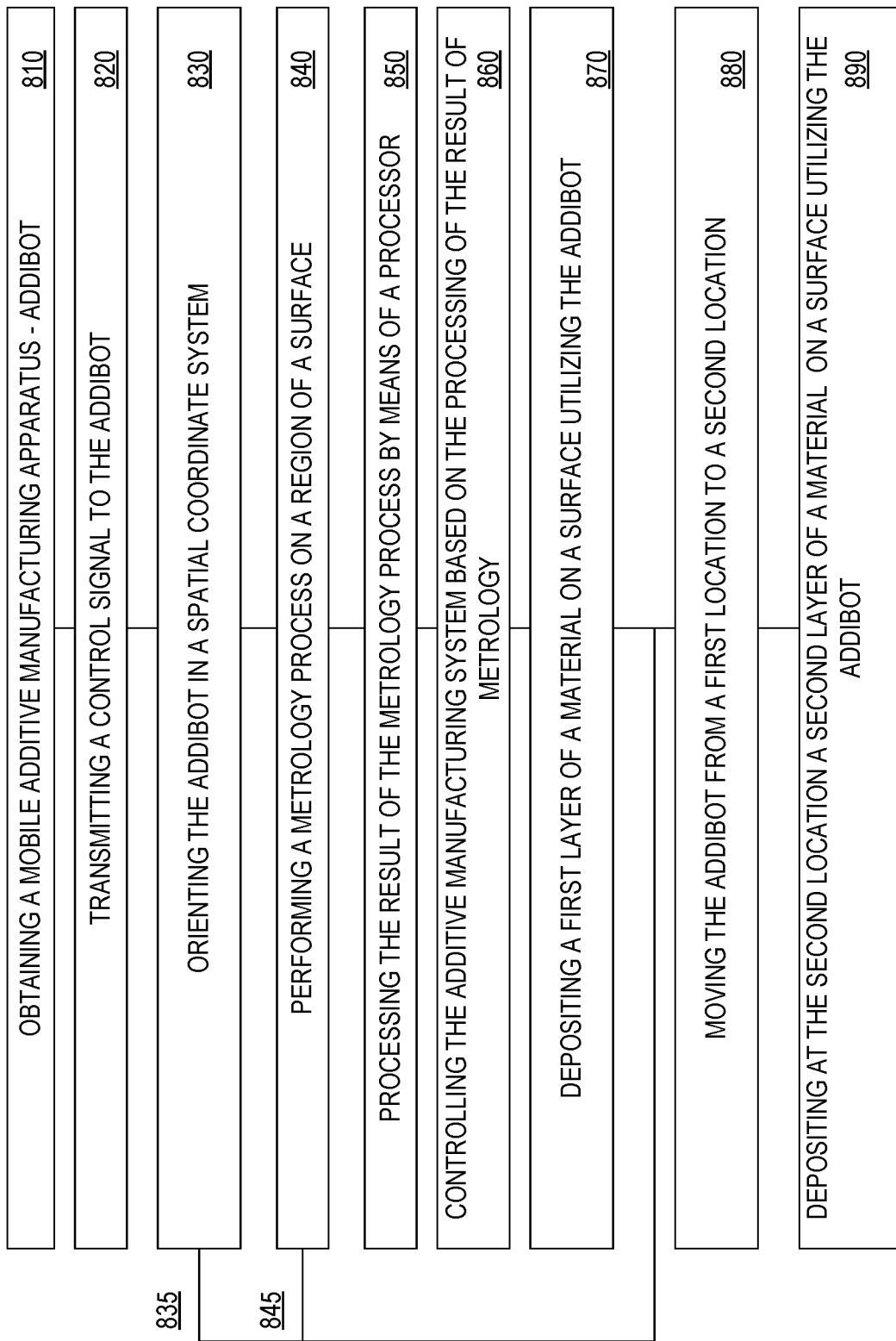
FIG. 8 illustrates exemplary methods related to various examples of Addibots.

There may be numerous methods of utilizing an Addibot, manufacturing an Addibot or creating a product with an Addibot. Referring to FIG. 8, an exemplary set of method steps that may be commonly utilized in numerous examples of Addibots are displayed. The steps are displayed in a flow chart for example. The steps may flexibly be used or not used and the order of the steps may be changed within the scope of the inventive art of Addibots.

At step 810, an Addibot of a particular type may be obtained by a user. Next, at step 820 the user may transmit a control signal to the Addibot. The transmitting may involve numerous means including a wireless transmission, a wired transmission or a transmission involving a physical interaction such as pushing a switch or a display panel of an Addibot. The initiation signal may cause a variety of responses that are proximately caused by the initiation even if further interaction with the user is or is not required or if the Addibot will flexibly respond to its environment or programming thereafter.

At 830, in some examples the Addibot may perform an orientation step. This step may assess one or more of determining a spatial location in a spatial coordinate system and may also assess movement and direction of movement or potential movement in a spatial coordinate system.

At 840, in some examples the Addibot may perform a metrology process on a region of a surface. In other examples at 840 an apparatus external to an Addibot may perform a metrology process on a region of a surface and may communicate information to an Addibot related to the metrology or related to the processing of the metrology data 850 in some form.

Additionally at 850, in some examples the Addibot may process the result of the metrology by means of a processor. In some examples, the said process may be one as described in FIG. 7.

At 860, in some examples the Addibot will utilize the information that it has received in various manners about the surface and any desired model that results from this information and based on a digital model provide controlling signals to the additive manufacturing system.

At 870, in some examples, the Addibot will deposit a first layer of material on a surface.

At 835, there may be a loop process that occurs in some examples and under some situations that may cause the Addibot to return to step 830 and continue processing. Alternative, in some examples, as shown at step 845 a loop process may occur that may cause the Addibot to return to step 840 and continue processing.

At 880, a step may occur where the Addibot is moved from a first location to a second location. In some examples, a characteristics of this movement is that as part of the Addibot moving the additive manufacturing system as a whole moves from a first location to a second location even if portions of the additive manufacturing system could move some or all of the printing head or other additive element to the same second location without a movement of the Addibot.

At step 890, the Addibot may deposit at the second location a second layer of material. The nature of the second deposit may comprise a different material, or a same material. The nature of the second deposit may comprise a different physical characteristic such as thickness or the same characteristic as a first deposit. The second deposit may be contiguous with a first deposit but be located at a second location and be considered a second deposit, by the very nature of being at a second location.

Operation of an Addibot on Vertical Surfaces

Figure 9:
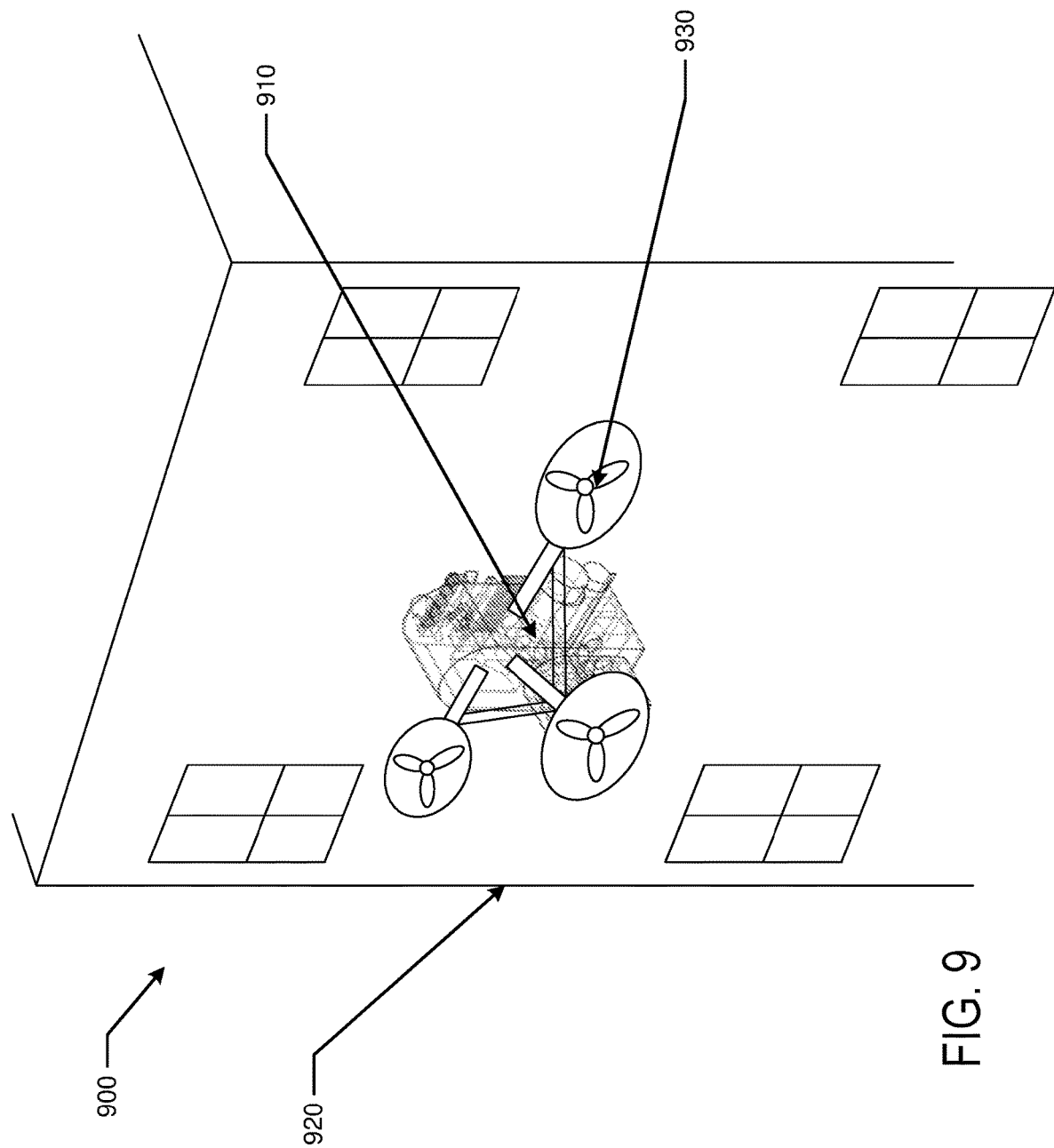
FIG. 9 illustrates an example of an Addibot design for traversing and treating surfaces that have a vertical component.

Referring to FIG. 9, an exemplary Addibot design that may function on a vertical surface is illustrated. In some examples, a purely vertical surface may be processed by the Addibot; however, it may be possible that a "vertical" surface may be a wall or other surface that has at least a component in a vertical dimension. There may be examples between vertical and horizontal that may be treated as a horizontal surface might be treated, as a vertical surface would be treated or as both surface types might be treated.

In FIG. 9, 900 may depict a vertical treatment. A wall 920 may have a significant component in a vertical direction. Thus, an Addibot may need to be supported in a manner that overcomes a gravitational force that may not be completely supported upon wheels of such a device. Vertical motion may be supported in some examples by rotary fans 930 which may direct air to support the Addibot in a configuration or move it in other configurations. There may be many types of rotary fan apparatus, such as those deployed in helicopters, drones or the like. Combinations of lighter than air balloons with rotary fans may represent another example.

An Addibot 910 which is deployed into a vertical direction may have other alterations that are required to its components. As a non-limiting example, the deployment of fluids by the Addibot may be affected by the orientation of the device relative to gravity. In some examples, pumps may be utilized to supplement previous effects that were related to the effect of gravity. In other examples, valves may be used to counteract the effect of orientation in a vertical direction upon materials within the device.

Figure 10:
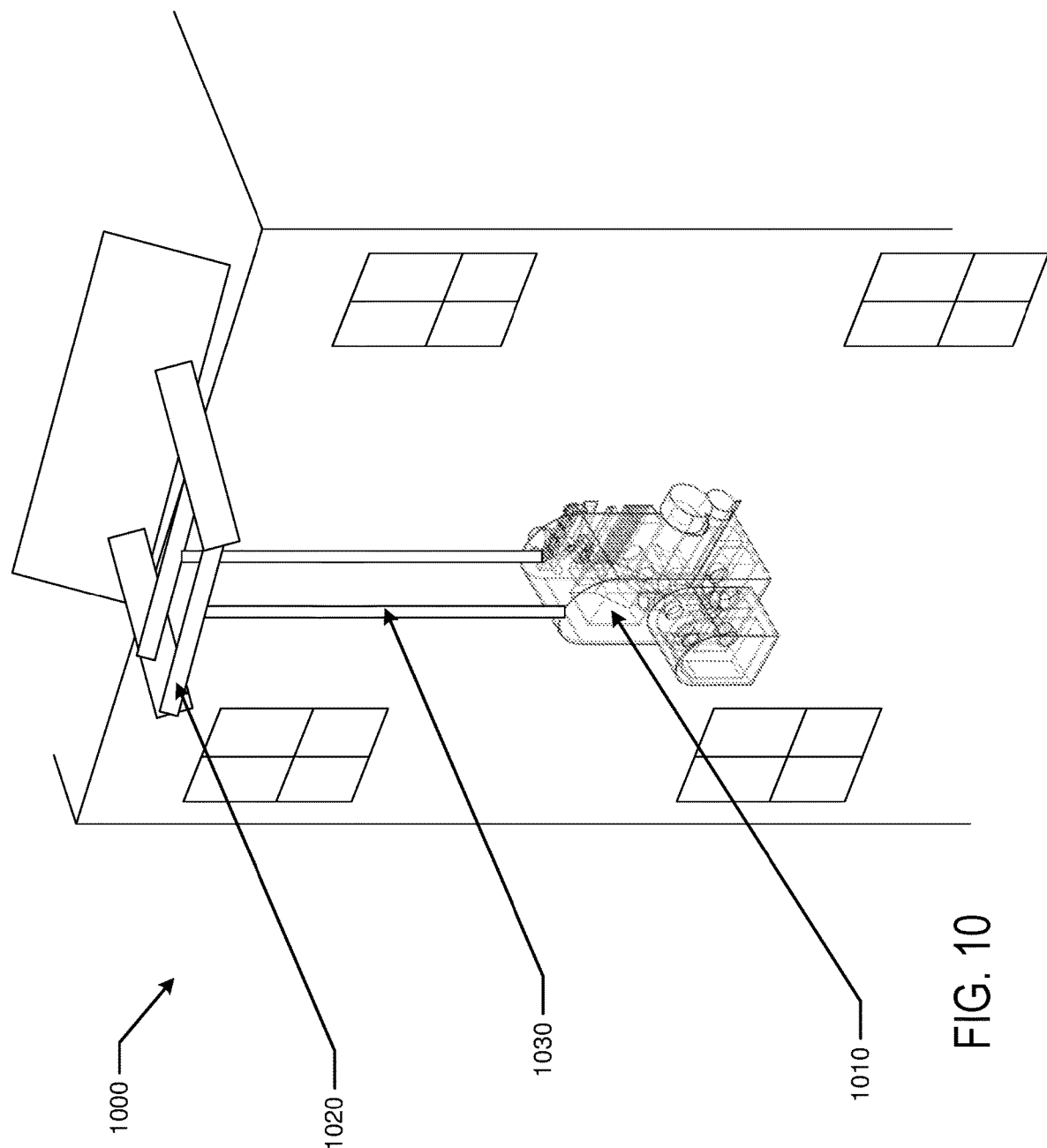
FIG. 10 illustrates an example of a suspended Addibot design for traversing and treating surfaces that have a vertical component.

Referring to FIG. 10, an alternative vertical treatment 1000 may be depicted. As an alternative example, the weight of an Addibot 1010, may be offset by supporting members 1030. The supporting members 1030 may comprise wires, rods or the like and may connect to a vertical support member 1020 that may be attached to the vertical surface or support for the vertical surface.

Figure 11:
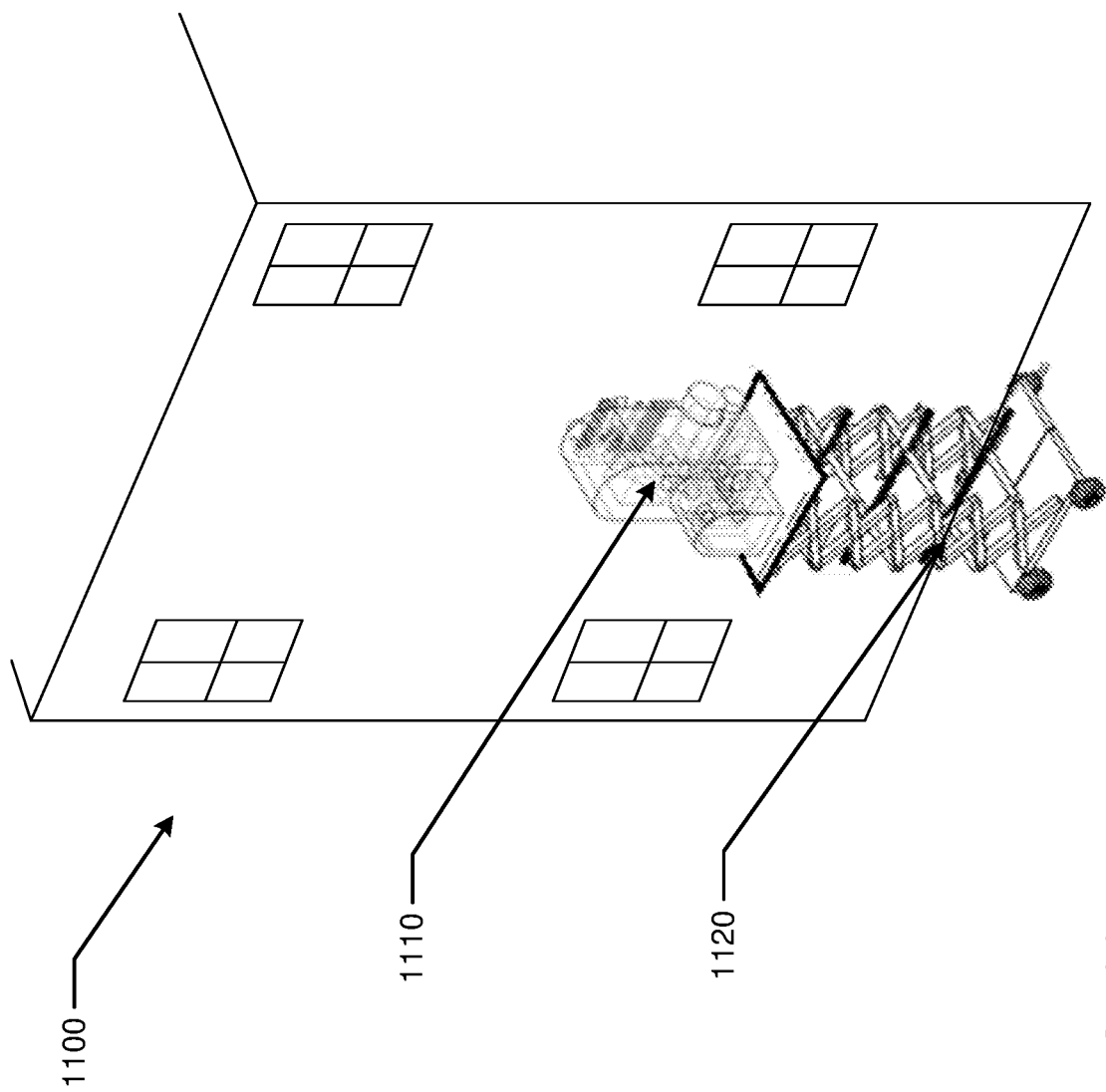
FIG. 11 illustrates an example of a supported Addibot design for traversing and treating surfaces that have a vertical component.

Referring to FIG. 11, an alternative vertical treatment 1100 may be depicted. In these examples, the weight of an Addibot 1110 may be supported by a supporting mechanism 1120. The supporting mechanism 1120 may have components that allow for the raising and lowering of a support for the Addibot 1110 in a vertical direction. In non-limiting examples, the components that allow for raising and lowering may include "scissor" type support members as depicted in 1100 that raise and lower by the application of motors upon lead screws. In other examples, pistons and telescoping members may be used in a manner to raise and lower the device in a non-limiting sense.

Operation of an Addibot Over Surfaces

Figure 12A:
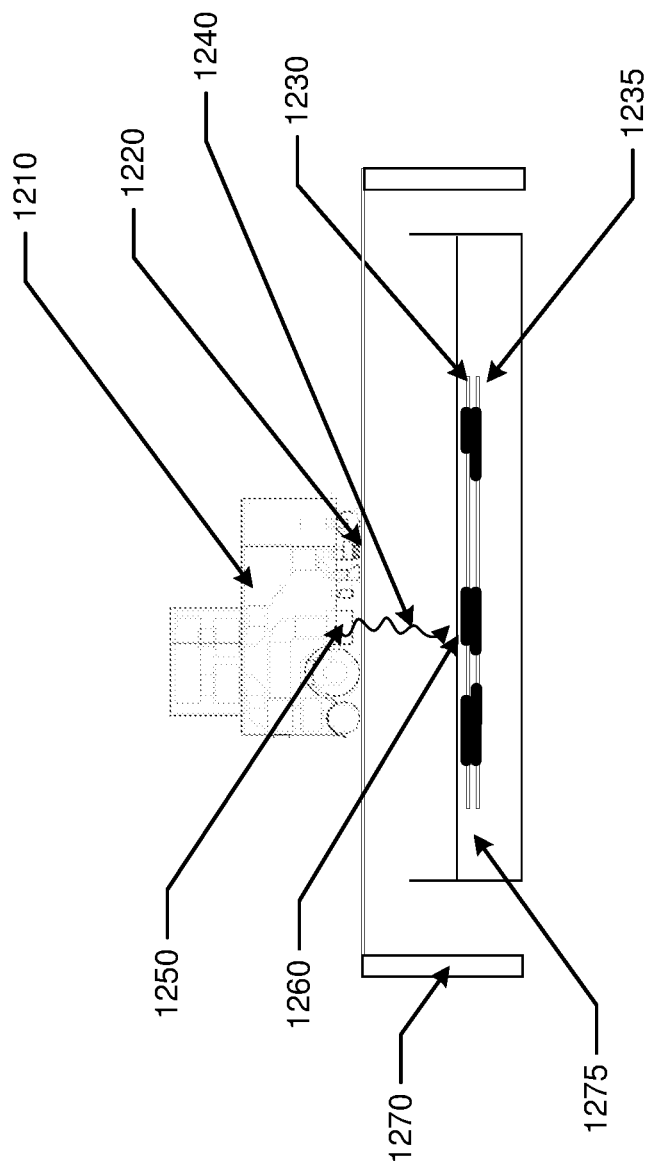
FIG. 12A illustrates an exemplary system for operating an Addibot on a transparent support over a surface.

In some examples an Addibot may be operated upon a surface where it acts upon material that is beneath the surface. Referring to FIG. 12A, an Addibot 1210 may be represented of various types described herein. It may operate upon surface 1220. Surface 1220 may be transparent to light in various spectral regions. Directed light energy 1240 may be emitted by a component portion 1250 of Addibot 1210. The directed light energy may impinge upon a material surface 1260 of liquid or powder form materials. The light energy may induce a chemical or physical reaction upon the surface and cause it to solidify in predesigned conditions. Such an additive process may be consistent with description herein of stereolithography processing. There may be other types of stereolithography processing that may be processed with an Addibot upon a surface.

In FIG. 12A the surface 1220 may be supported by support members 1270. The liquid or powder form materials may be located in a container 1275. In the case of liquid form material the work object 1230 may be supported upon a stage 1235 that is translated down into the liquid as each layer is processed. In powder form, the stage 1235 may likewise be transported in a vertical direction, then additional powder may be added and shaped into a thin layer upon the work object.

Figure 12B:
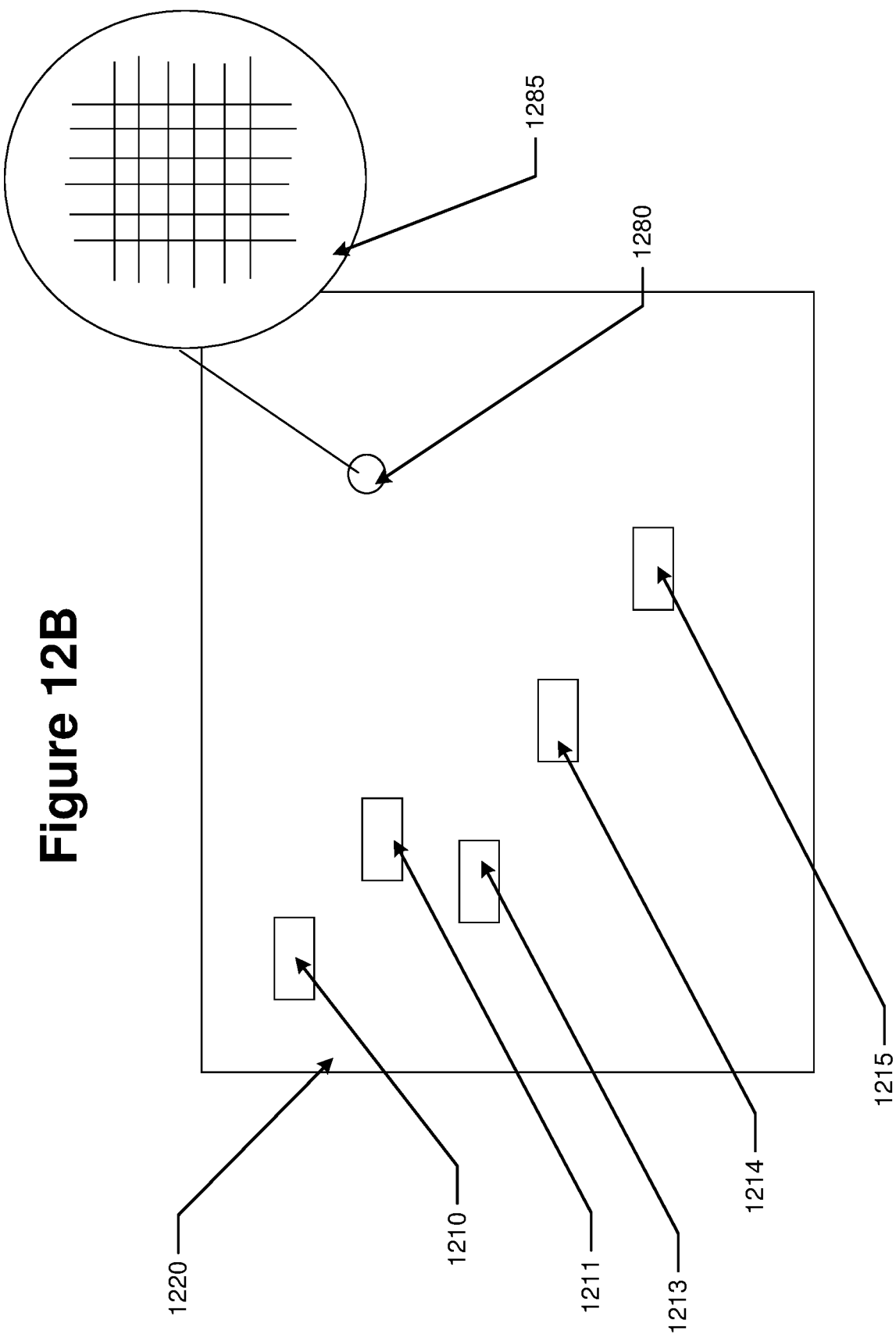
FIG. 12B illustrates a top view of an exemplary system for operating a team of Addibots on a transparent support over a surface.

There may be numerous Addibots that are acting upon the surface, and the object to be fabricated may therefore be quite large. Referring to FIG. 12B, multiple Addibots may be represented by Addibot 1210, second Addibot 1211, third Addibot 1213, fourth Addibot 1214 and fifth Addibot 1215. These Addibots may be supported by surface 1220 but act upon material beneath the surface 1220 as described previously. There may be numerous means to communicate directions to the multiple Addibots to coordinate their combined action upon the material beneath the surface 1220. As well, upon the surface there may be features that locally and globally provide alignment information for Addibots moving upon the surface. Inset 1280 shows a blowup of a region of a surface with an exemplary grid 1285 depicted. The grid may be formed by various materials. In some examples the grid may be created from material that are transparent to the light energy 1240 but opaque at other wavelengths which may be used as means for an alignment system upon the Addibot to detect location. The grid may also include identification information in various forms, such as bar codes, letters or other types of codes to identify the location of the alignment feature. As well, the grid pattern may provide a location calibration signal, whereas other systems such as laser alignment or RF alignment systems may provide more global information to Addibots on their location. In some examples, the alignment grid may comprise electrically conductive materials, and Addibots may physically or wirelessly connect to the grid pattern for alignment information.

Material Extrusion

Figure 12D:
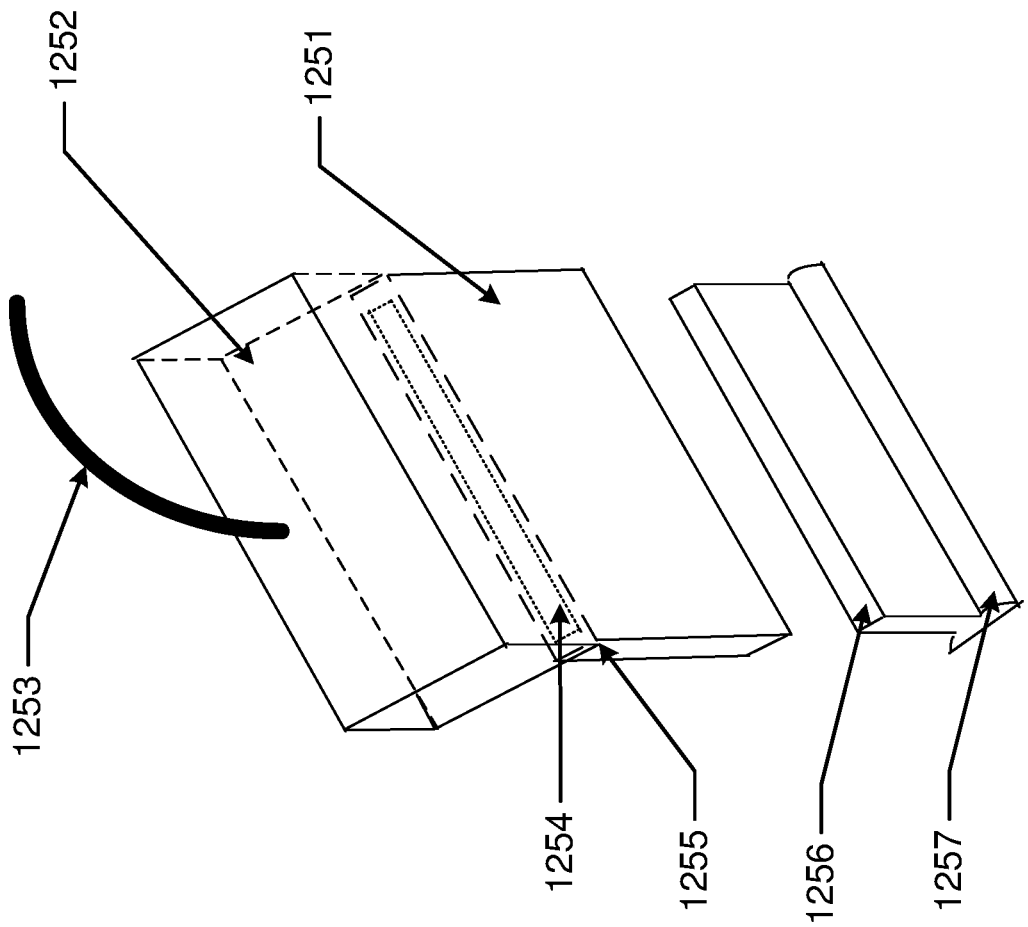
FIG. 12D illustrates a view of an alternative exemplary extrusion component that may be useful in creating molded extruded features.
Figure 12C:
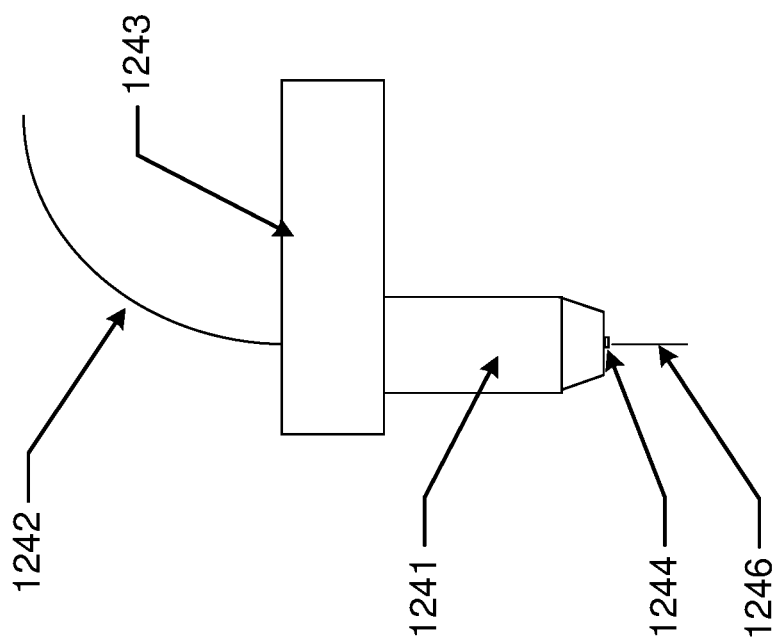
FIG. 12C illustrates a view of an exemplary extrusion component.

Referring to FIG. 12C, an exemplary material extrusion device may be found. A heated extrusion head 1241 may heat extrusion material 1242. Some examples of extrusion material may include ABS, PLA and other plastic materials that have relatively low melting temperatures. A feeding apparatus 1243 may be used to feed extrusion material 1242 into the heated extrusion head 1241. Molten or semi-molten material may be extruded through an extrusion head 1244 resulting in narrow melted material 1246 that may be formed upon a surface.

The extrusion of material may be performed in novel manners where the material may be extruded from a mold type shape where two faces are used to contain the molten material in defined shapes. There may be numerous types of shapes that may be formed. Referring to FIG. 12D, a basic example of an extrusion apparatus based upon parallel plates is demonstrated. In some examples, the plates may be coated with materials that prevent the adherence of the extrusion material upon the surface. Examples of the coating may include non-stick Teflon based materials as well as non-stick ceramic materials as non-limiting examples. In some examples a wire form of the extrusion material 1253 may be fed into the molding apparatus by a feeder 1252. The region of the feeder 1252 may be temperature controlled, and at an elevated temperature to melt or partially melt the extrusion material 1253. A rectangular extrusion region 1254 may be formed by plates 1255 of coated material in some examples. The plates 1255 may be heated by a heating device 1251. The heating device 1251 may be a resistive heater, coil heater or other device capable of heating the region during the extrusion of the extrusion material 1253. The region at 1251 may be kept at a different temperature than 1252 to allow for molten material to be forced onto a surface through the rectangular extrusion region 1254. The resulting extruded material may form a surface bonding region 1257 which may be larger than the rectangular extrusion region 1254 that the material was extruded from. As one moves away from the surface the extruded material 1256 may assume a shape defined by the rectangular extrusion region 1254.

There may be numerous manners to extrude material in the device illustrated in FIG. 12D. In some examples, the feeding of extrusion material 1253 may force the extrusion. In other examples pistons may force molten material into the extrusion device. In still further examples, pressurized fluids or gasses may be used to force molten material out of a region where it is melted and into a molding form. In some examples, complicated molding forms may be formed from coated plates such as in the illustrative device in FIG. 12D. In some examples, versions of the molding form may be completed where the plates have the ability to be moved relative to each other. In some examples, a wire form material will be introduced into a melting region, after a sufficient time in the melting region, a control signal may cause pressurized gas to push the molten material into the form. The form or molding form may contain the molten material to a shape, and thereafter, as the molding form may be maintained at a lower temperature the material may slowly solidify in the shape of the molding form. In some examples, one or more of the molding plates may be moved away from another releasing the solidified material in place. The mold or form may then be moved upwards from the surface and in the process of moving release the formed molded material.

Figure 12E:
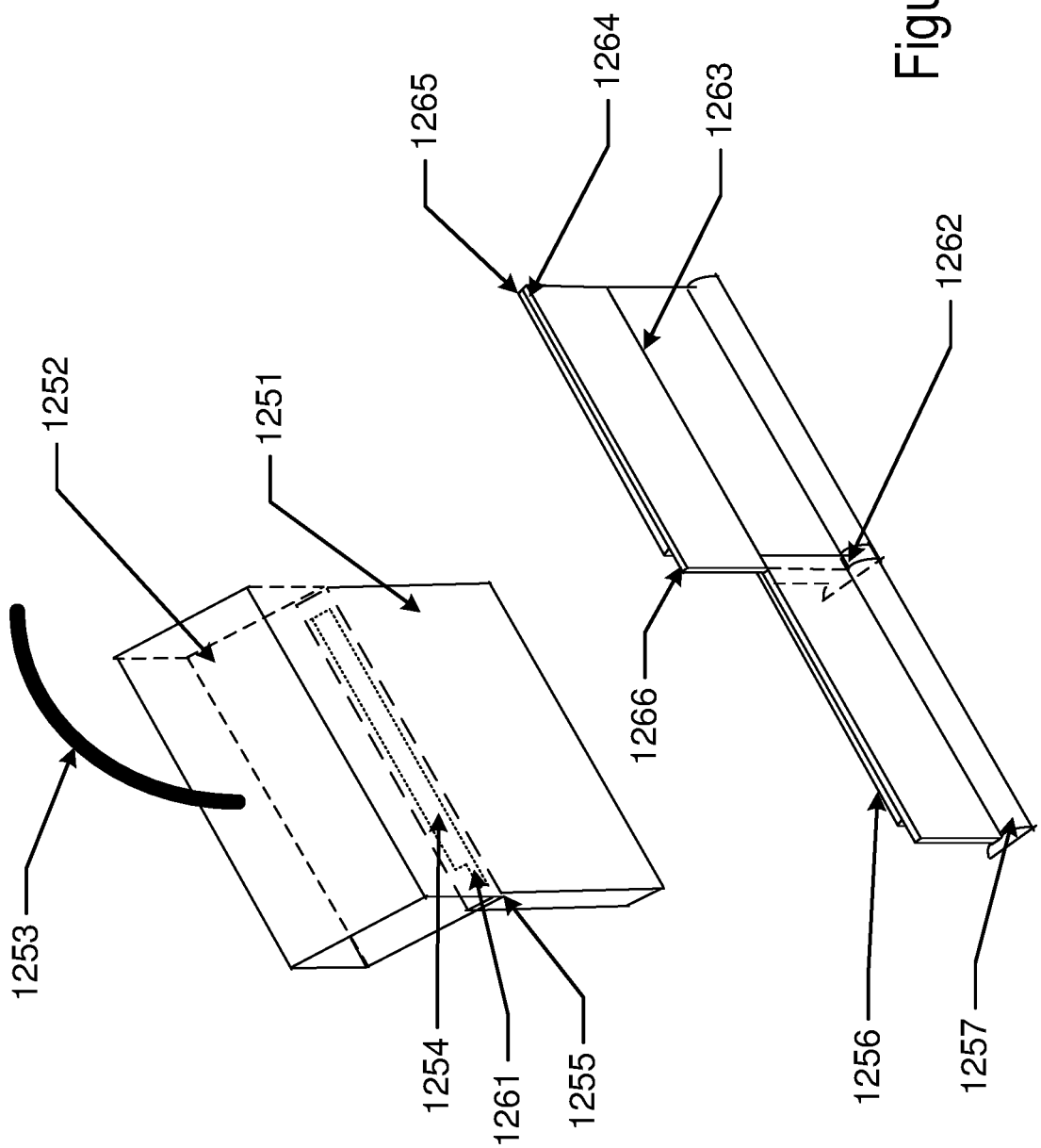
FIG. 12E illustrates a view of an alternative exemplary extrusion component and structures that may be formed by repeated use of the component.

Referring to FIG. 12E, the exemplary formation of structures by the repeated processing of extrusion of molten material in molding forms may be depicted. The details of the molding form may involve more complicated features 1261 than have been depicted such as end plates that may be moved to allow for overlap with previously formed structures. In FIG. 12E the result of three extrusion processes may be depicted with seals between the process steps such as process step 1262 and process step 1263. At process step 1262 vertical sides may be overlapped and joined in various manners. In a non-limiting example, each of the sides may have overlapping features that repeat with additional processing. For example an end overlapping feature 1266, a top overlapping feature defined by edge 1265 and recessed edge 1264. The features and shapes are illustrated as non-limiting examples of how the extrusion devices may form various structures.

Figure 13A:
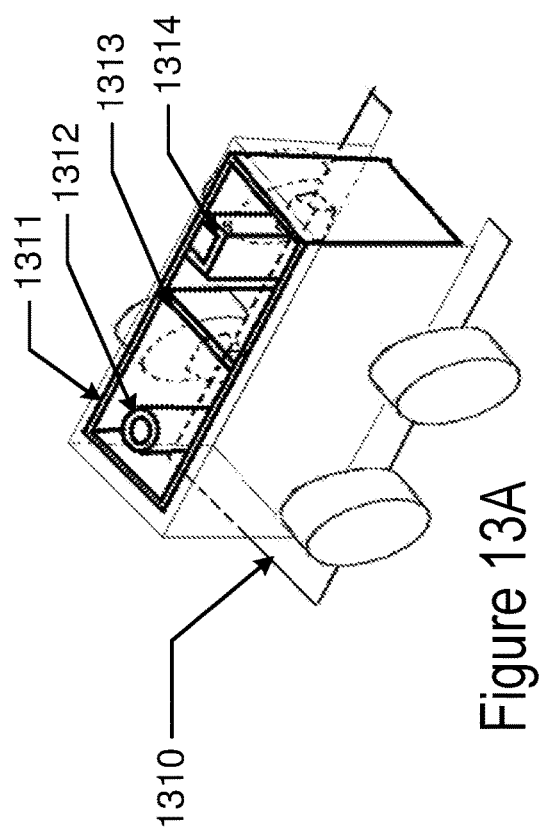
FIG. 13A illustrates a perspective view of a portion of an Addibot that contains exemplary molding components in an exemplary shape for wall building.

Exemplary Extrusion Components for Structure Formation in Mobile Automated Additive Manufacturing Extrusion devices may be formed in various shapes consistent with the processing needs has have been described. Referring to FIG. 13A, a portion of an Addibot may be observed where a molding form portion of the Addibot may be depicted in isolation. In the example, a portion of the supporting chassis 1310 may be attached to the portions of the Addibot used to control movements of the device. The chassis may have connections to a molding device. The top of the molding device has been excluded in FIG. 13A to allow for an illustration of a relatively complicated mold form as shown. Features such as straight runs 1311 and internal cylinders 1312, internal straight runs 1313 and internal channels 1314 may be observed in the mold form. While the particular design of the mold form is shown as an example, it may be apparent that many alterations in design may be easily achieved; and in fact versions of the molding apparatus may be defined which may have their feature shape changed. Referring again to the exemplary mold form design in FIG. 13A it may be apparent that the shape of an extruded piece defined by the form may create an exemplary shape that may be filled with other materials such as concrete, plaster, mud and other materials consistent with wall design. In some examples, features may be defined which mimic the role and shape of studs in walls, where the walls may not be completely filled. The channel and cylinder type features may be useful for creating gaps and channels in solidified walls that may in an example be used to route wires, conduits, ducts and the like.

Figure 13B:
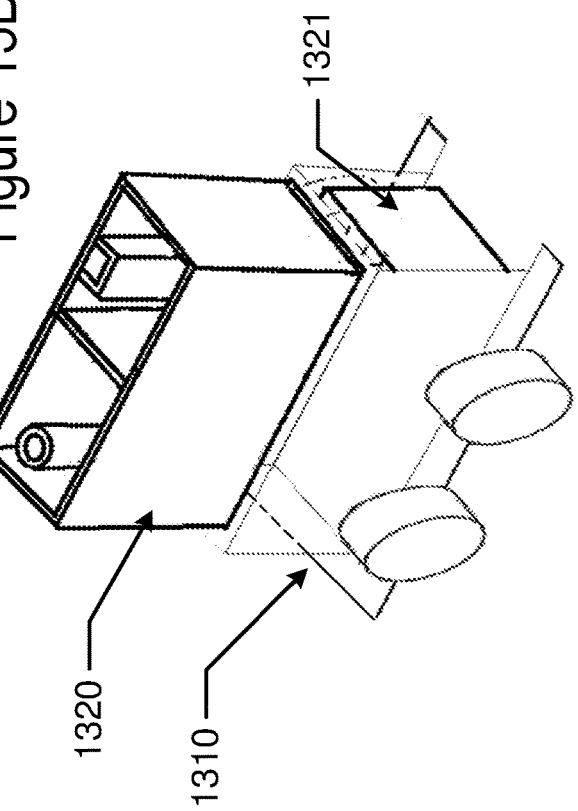
FIG. 13B illustrates a perspective view of the portion of an Addibot illustrated in FIG. 13A wherein the molding component is illustrated in a position after molding.

Referring to FIG. 13B, the exemplary Addibot with molding feature 1320 for additive manufacturing may be shown in a position after an initial structure has been formed by extrusion. The molding feature 1320 may be lifted by various mechanisms within the body of the Addibot. As mentioned previously, the molding features 1320 may have plates that may be movable relative to each other. In some examples, after molten material is extruded into the mold and cooled to solidify the material, the molding feature 1320 may be lifted so that it resides fully above the solidified structure 1321 that may be formed according to the various types of methods described. The lifting mechanism may be supported upon the supporting chassis 1310 of the Addibot.

Figure 13C:
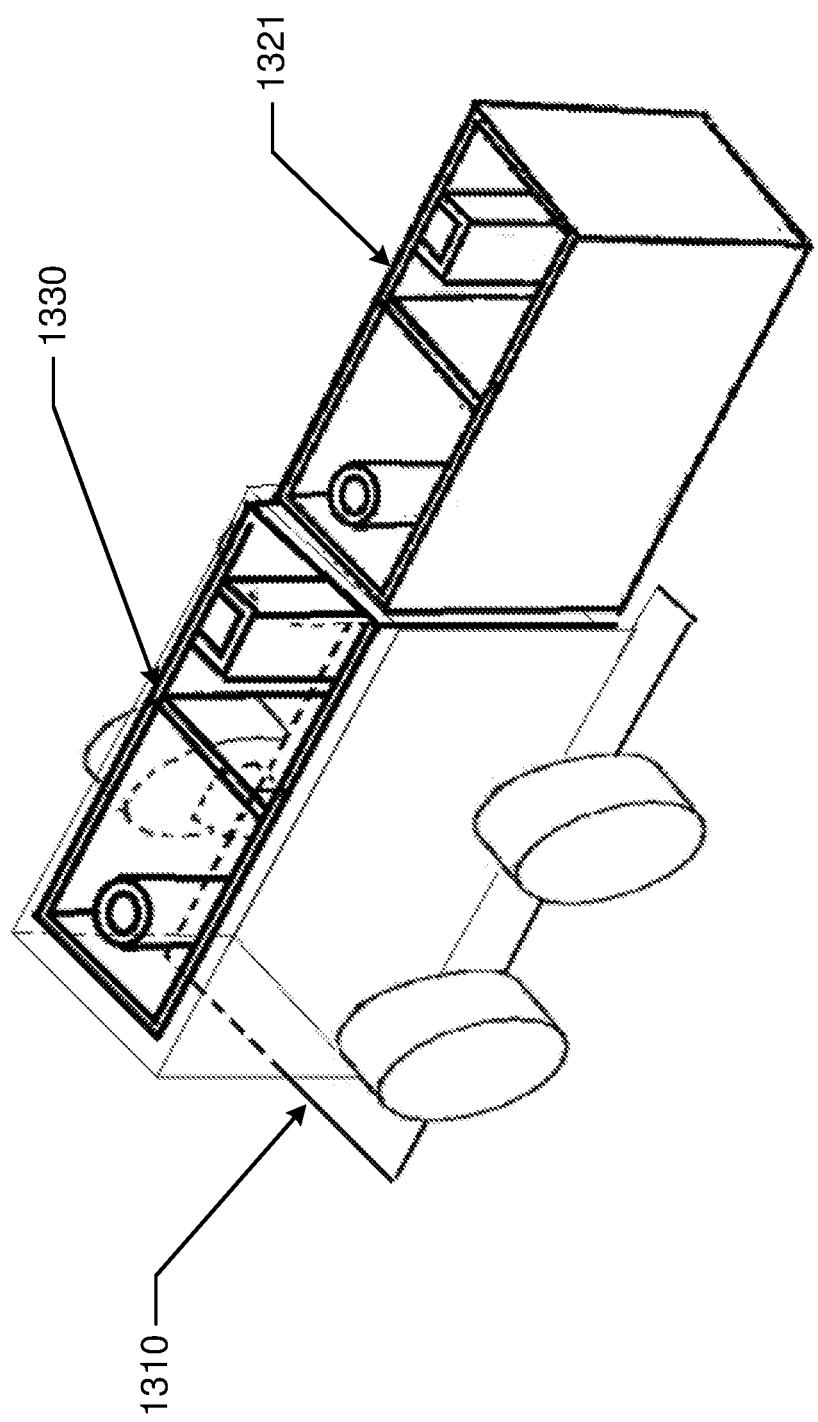
FIG. 13C illustrates a continued progression of an exemplary Addibot molding component in use to create wall structures.

Referring to FIG. 13C, the exemplary Addibot may move to a next processing position 1330. By moving, the previously formed solidified structure 1321 is now exposed. The movement of the Addibot from one location to a next location may be controlled by a digital model that may reside in a controller in the Addibot. One aspect of an Addibot may be that a digital model may be made to define a large structure that will be manufactured by an Addibot or a team of Addibots. In the example of FIG. 13C the structure being created may represent a wall being built. The wall may be built of extruded material. In some examples a single level of extruded structures may be filled with a material to form a fortified wall. In some examples, the structures may be filled with concrete, macadam, plaster, polymer, fluids or other materials. A version of an Addibot may be used to extrude these filling materials into the structures. In some examples, the extruded material structures may be formed in such a manner that an Addibot may ride at a second level upon the first level structure that was formed. In some examples, a series of levels may be formed before the structure are filled with fortifying material. There may be various supporting equipment that may aid in the processing of walls and other structures in this manner, such as lifts, elevators, movable scaffolds and the like.

Advanced Roadway Construction with Addibots

Figure 14A:
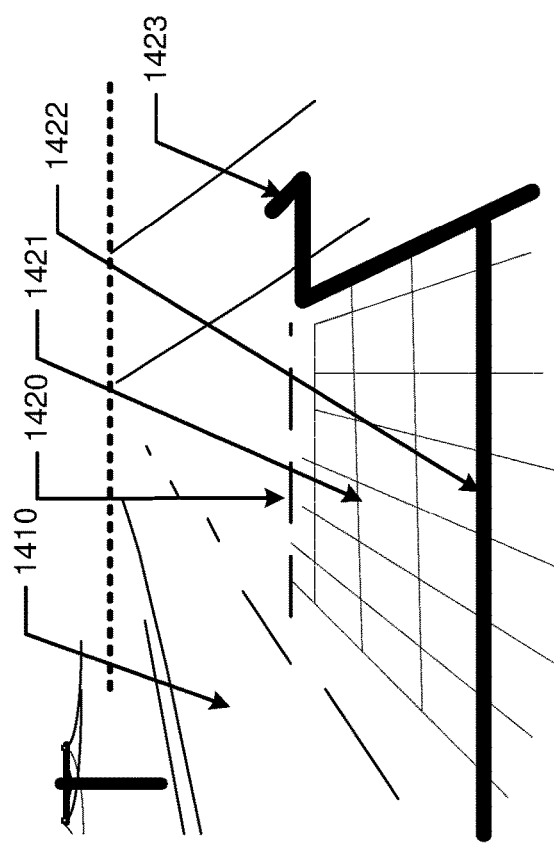
FIG. 14A illustrates exemplary advanced roadway structure that may be formed by Addibots.

Examples of structure building with extrusion components within an Addibot have been described in the recent section. Different versions of extrusion components may be used to construct advanced roadways as well. The use of the term roadway in this disclosure is intended to embrace an inclusive definition as may be standard in the industry wherein a roadway includes the lanes for vehicular traffic, the shoulders along those lanes, medians between on-coming lanes, turning lanes, and margins along the shoulders to separate the roadway from its surroundings. Referring to FIG. 14A, some features that may be produced by an Addibot configured to support roadway construction may be observed. A roadway 1410 may be formed in the various standard manners that such surfaces are constructed. There may be an interface 1420, where a roadway according to the present disclosure has an advanced formed base with a filled bed material. Thereafter, Addibots may extrude various structural features. As an example, some roadway designs require the possibility for a roadway to expand under heat with expansion joints or other expansion elements. In some examples, an Addibot may extrude a feature at a location along the roadway surface. The location of the feature may be present in a model of the roadway that exists in Addibots and controlling apparatus for an Addibot or combinations of Addibots. The extruded feature may, as an example, be a channel that is formed at the full height or nearly the full height of the roadway bed when the roadway is completed. In some examples, the channel may be filled with a material. In some examples the material filling the channel may be a sealing material that may flexibly deform under thermal load and various pressures and forces from both the roadway and eventual traffic along the roadway. In some examples, the material filled into the channel may be a material such as a salt that will dissolve under the action of water to expose a well-controlled gap in the roadway.

Addibots may be used to extrude supporting meshes 1421 of various kinds, shapes and designs. In some examples an extrusion pattern may be a cross-hatch pattern. A cross-hatch pattern according to this disclosure is a pattern where two or more features of the pattern approximate intersecting lines. In other examples a unit cell pattern, where a unit cell pattern means a pattern where portions of the pattern are repeated, a beehive pattern or various other patterns that could be useful in supporting a roadbed under the various stresses that it is exposed to. In some examples, the extruded material may be a composite of molten material with embedded fibers, nanofibers, nanotubes and other materials which may increase strength, flexibility, ability to stretch and other material characteristics that may be desirable for a supporting material which may be embedded in a roadbed. In some examples, the bed of the roadway may be comprised of asphalt of a given thickness. As an example, consider a bed of 16 inch thickness asphalt. In some examples, the extruded supporting material may be a full six inch thickness, a portion of the six inches, or in some examples, the roadway may be formed in multiple levels each one having another extruded layer. In some examples, the extruded material may be formulated with supporting material embedded within where the molten material may be chosen to fully or partially mix into the hot asphalt as it is laid. A partial melt of the material may leave a strengthening pattern of fibers, nanotubes and the like within the roadway yet not create significant gaps within the roadway bed.

Another feature that may be added to the roadway surface may be a channel 1422 that may be used to embed materials such as conductive material within a roadway. There may be numerous uses for embedded conductive material including sensing of various kind, communication interface through wireless means and communication routing along the roadway. As shown the channel 1422 may route electrical connections along a roadway and may also route them to the side of the roadway at side channel 1423. The extrusion techniques and apparatus may be used to form channels as portions of the deposited material. The channel may contain electrically conductive material with other materials as well. In some examples, the channel may contain communication devices such as optical fiber. The optical fiber may route signals along the roadway as well as to devices along or embedded within the roadway. The channel may be filed with insulating materials of various kinds and in some examples, portions of the channel may also may be topped with structures that act as antenna. In some other examples, the channel may be layered with different layers of materials, some of the layer may contain and insulate metallic wires, optical fiber and other such active components.

Figure 14B:
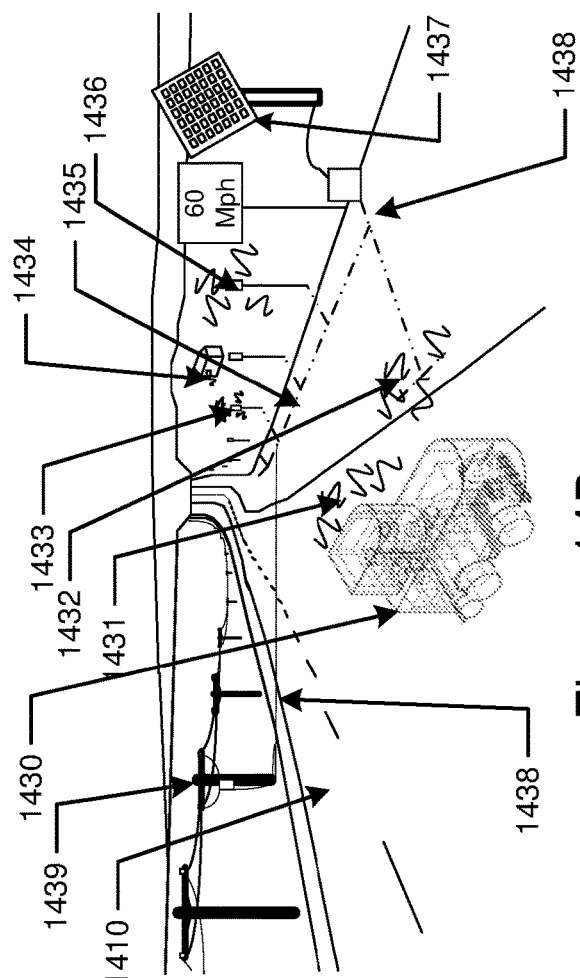
FIG. 14B illustrates an exemplary Addibot in concert with features of an advanced roadway.

Referring to FIG. 14B, an advanced roadway 1410 in conjunction with an Addibot 1430 is depicted. In some examples, an advanced roadway may have been formed with use of Addibots in a manner as described. The roadway may be formed with embedded sensors, antennas or other devices for facilitating communication 1431 between an Addibot 1430 and the advanced roadway 1410. Within the advanced roadway 1410 may be communication devices 1432 that may be buried within the roadway, the shoulder or the side of the roadway or be upon these locations. In some examples, there may be communication devices on roadway poles, signs and the like. The communication 1431 may comprise wireless communication and may involve radio frequency, infrared frequency, optical frequency or other forms of wireless communication. In some examples, the advanced roadway may be formed with embedded fibers 1435 formed of conductive materials or optical fiber. The embedded fibers 1435 may also be considered wires. There may be connection of wires 1438 to power sources along the roadway. The power sources may be standalone sources such as solar panels 1437 or be connected to power transmission grids 1439.

Communication signals may be routed through the advanced roadway and shoulders of roadways as depicted in FIG. 14B. In some examples, the communication signals may be routed out of the roadway to a wireless transmitter 1433 located along the roadway. In some examples, signals may be transmitted from one wireless transmitter 1433 to another transmitter 1436. A combination of transmission through conduits in the roadbed and to roadside transmitters may be used to transmit signals of various kinds. In some examples the signals may relate to the movement of traffic along the roadway. The signals may also relate to conditions along the roadway as detected by sensors or traffic itself. In other examples the signals may involve communication signals unrelated to the traffic and may be standard communications that are routed along roadways. The signals from the roadside communication transmitters such as wireless transmitter 1433 may be routed to neighboring structures 1434 such as residences or businesses. The transmissions in some examples may comprise standard internet communication transmissions, or in other examples the signals may relate to traffic flow along the roadway. Autonomous vehicles may use the various communications and sensor pathways as part of technological support of the traffic flow. Signals from traffic may be routed from vehicle to vehicle with the support of the roadway communication system. And, signals from traffic may be routed along wireless pathways to internet connections to central controllers for traffic flow that may be located at off road sites such as neighboring structures 1434. The internet connections may be used to transmit signals from and to remote control systems.

In an example related to FIG. 14B, the communication and control systems may be used to control repair of advanced roadways. Addibot 1430, may be guided to regions that need repair of various types. The need for repair may be detected in various manners such as for example sensors or image capture devices on traffic vehicles, control information provided by human inspectors or roadway users or the like. In another use of the communication infrastructure of the exemplary advanced roadway system, the Addibot can also receive location information from the information and communication systems of the advanced roadway.

Referring to FIG. 15, an illustration of exemplary defects in a roadway 1510 is illustrated. Cracks 1520 of various types may occur in a roadway surface. There may be numerous causes for the formation of cracks; but after a crack forms it can grow and generate more serious defects as water may begin to infiltrate the crack. A more serious defect may be represented by pothole 1530. Here too, there may be numerous causes for the formation of potholes. However, potholes will also tend to grow over time if they are not repaired. For illustrative purposes, pothole 1530 is illustrated with a level of water within the pothole. These exemplary types of defects and others may be treated by the utilization of an Addibot.

An Addibot, may be guided to a defect through communication of location information. In other examples, an Addibot may analyze a road surface to detect the presence of cracks or potholes in a non-limiting example. Teams of Addibots may survey roads and repair the defects that are found. Examples have been provided for the repair of potholes in conjunction with advanced roadways, it may be apparent that Addibots may be used in similar manners for repair of such features on generic roadways of various types.

The exemplary Addibot as has be described earlier in the present disclosure may be used to perform a process of repair, and referring to FIG. 16A, a repair on a pothole 1600 may be illustrated. An exemplary step for drying the pothole 1605 defect may start with a vacuum process or the addition of a drying agent followed by its removal. Next filling material may be added to the pothole. In an example, a composite material 1615 of filler and adhesive/sealing material may be added in addition step 1610.

In another example of an addition step 1620, a layer of filler material 1625 such as stone may be added as an example. An addition step 1630 may add a layer of adhesive and sealing material 1635 upon the layer deposited in the addition step 1620. In some examples, the addition step 1620 and addition step 1630 may be performed and then repeated in sequence numerous times until the pothole 1600 is filled to an appropriate level. In some examples, the appropriate fill level may be to the top of the pothole 1600 to be level with the surrounding roadway. In other examples the appropriate fill level may be above the level of the surrounding roadway.

In some examples, the filed pothole 1600 may be further processed by processing after filling 1640. The processing after filling may include rolling or other high pressure treatments to consolidate the filled material. In other examples, treatments with polymerizing treatments such as exposure to Ultra-Violet light (UV) may be performed to initiate polymerization reactions with appropriate polymerizable material if it was included in the adding of a layer of adhesive or sealing material steps. In some examples, a cooling treatment 1645 may be performed if the filler material and adhesive and sealing material are added hot or generate heat in their polymerization processing. The cooling treatment 1645 may be performed to cool at least a surface layer of the filled material so that traffic may be allowed to run on the repaired roadway.

The exemplary Addibot as has be described earlier in the present disclosure may be used to perform a process of repair, and referring to FIG. 16B, a repair of cracks 1650 may be illustrated. An exemplary step for cleaning the cracks 1655 may start with a cleaning with pressurized air as a non-limiting example. Next filling material may be added to the crack. In an example, a sealing agent 1665 may be added in addition step 1660. The Addibot may position a component to perform the addition step 1660.

In another example of an addition step 1670, an array of components may deposit multiple locations of droplets 1675 of sealing material. The pattern of the multiple droplets may be controlled by a controller within the Addibot. As the Addibot moves over the roadway it may dispense sealing material at appropriate locations based on crack location. In some examples, the steps at 1660 and 1670 may be performed and then repeated in sequence numerous times until the crack 1650 at a particular location is filled to an appropriate level. In some examples, the appropriate fill level may be to the top of the crack 1650 to be level with the surrounding roadway. In other examples the appropriate file level may be above the level of the surrounding roadway.

In some examples, the filed crack 1650 may be further processed by processing after filling 1680. The processing after filling may include rolling or other high pressure treatments to consolidate the filled material. In other examples, treatments with polymerizing treatments such as exposure to Ultra-Violet light (UV) may be performed to initiate polymerization reactions with appropriate polymerizable material if it was included in the adding of sealing material steps. In some examples, a cooling treatment 1685 may be performed if the filler material and adhesive and sealing material are added hot or generate heat in their polymerization processing. The cooling treatment 1685 may be performed to cool at least a surface layer of the filled material so that traffic may be allowed to run on the repaired roadway. Examples have been provided for the repair of cracks in conjunction with discussion of advanced roadway, it may be apparent that Addibots may be used in similar manners for repair of such features on generic roadways of various types.

The interaction of an Addibot and an advanced roadway may be useful in both the respect of creating the advanced roadway and in repairing it. The resulting advanced roadway may also be useful for advanced vehicle operation as well. In a non-limiting example, driverless cars may receive communication, location information, intra-vehicle information sharing, guidance related information and the like through operation of the components of the advanced roadway as described herein. Referring to FIG. 17, an advanced roadway 1710 in conjunction with a vehicle 1730 is depicted. In some examples, an advanced roadway may have been formed with use of Addibots in a manner as described. The roadway may be formed with embedded sensors, antennas or other devices for facilitating communication 1731 between a vehicle 1730 and the advanced roadway 1710. Within the advanced roadway 1710 may be communication devices 1732 that may be buried within the roadway, the shoulder or the side of the roadway or be upon these locations. In some examples, there may be communication devices on roadway poles, signs and the like. The communication 1731 may comprise wireless communication and may involve radio frequency, infrared frequency, optical frequency or other forms of wireless communication. In some examples, the advanced roadway may be formed with embedded fibers 1735 formed of conductive materials or optical fiber. The embedded fibers 1735 may also be considered wires. There may be connection of wires 1738 to power sources along the roadway. The power sources may be standalone sources such as solar panels 1737 or be connected to power transmission grids 1739.

Communication signals may be routed through the advanced roadway and shoulders of roadways as depicted in FIG. 17. In some examples, the communication signals may be routed out of the roadway to wireless transmitter 1733 located along the roadway. In some examples, signals may be transmitted from one wireless transmitter 1733 to another transmitter 1736. A combination of transmission through conduits in the roadbed and to roadside transmitters may be used to transmit signals of various kinds. In some examples the signals may relate to the movement of traffic along the roadway. The signals may also relate to conditions along the roadway as detected by sensors or traffic itself. In other examples the signals may involve communication signals unrelated to the traffic and may be standard communications that are routed along roadways. The signals from the roadside communication transmitters such as wireless transmitter 1733 may be routed to neighboring structures 1734 such as residences or businesses. The transmissions in some examples may comprise standard internet communication transmissions, or in other examples the signals may relate to traffic flow along the roadway. Autonomous vehicles may use the various communications and sensor pathways as part of technological support of the traffic flow. Signals from traffic may be routed from vehicle to vehicle with the support of the roadway communication system. And, signals from traffic may be routed along wireless pathways to internet connections to central controllers for traffic flow that may be located at off road sites such as neighboring structures 1734. The internet connections may be used to transmit signals from and to remote control systems. In some examples, the communication infrastructure of the advanced roadway system may be utilized for data communications that are not related to traffic, repair or other aspects of the roadway itself such as internet connectivity for residential and commercial operations within the vicinity of roadways.

Methods

There may be numerous methods of utilizing an Addibot, manufacturing an Addibot or creating a product with an Addibot. Referring again to FIG. 8 and now to FIG. 18, an exemplary set of method steps that may be commonly utilized in numerous examples of Addibots are displayed. The steps are displayed in a flow chart for example. The steps may flexibly be used or not used and the order of the steps may be changed within the scope of the inventive art of Addibots.

For these examples we can consider the methods in referring to FIG. 8, at 810, an Addibot of a particular type may be obtained by a user. Next, at step 820 the user may transmit a control signal to the Addibot. The transmitting may involve numerous means including a wireless transmission, a wired transmission or a transmission involving a physical interaction such as pushing a switch or a display panel of an Addibot. The initiation signal may cause a variety of responses that are proximately caused by the initiation even if further interaction with the user is or is not required or if the Addibot will flexibly respond to its environment or programming thereafter.

At 830, in some examples the Addibot may perform an orientation step. This step may assess one or more of determining a spatial location in a spatial coordinate system and may also assess movement and direction of movement or potential movement in a spatial coordinate system.

At step 840, in some examples the Addibot may perform a metrology process on a region of a surface. In other examples at step 840 an apparatus external to an Addibot may perform a metrology process on a region of a surface and may communicate information to an Addibot related to the metrology or related to the processing of the metrology data 850 in some form. In some examples, these metrology steps may involve the measurement of surface topography in such a manner as to identify cracks and holes or potholes in the surface of a roadway.

Additionally at 850, in some examples the Addibot may process the result of the metrology by means of a processor. The processor may in some examples identify the presence of a crack or other defect, determine a need for such a feature to be filled or otherwise have action performed on it, and then establish the location information for the feature detected.

At step 860, in some examples the Addibot will utilize the information that it has received in various manners about the surface and any desired model that results from this information and based on a digital model provide controlling signals to the additive manufacturing system. The controlling signals may cause a component to release material onto the surface at a prescribed time as the component becomes located over a desired location.

At step 870, in some examples, the Addibot will deposit a first layer of material on a surface. In some examples, the first layer of material will be comprised of adhesives or sealers. In some other examples, the first layer of material may be comprised of a mixture of aggregate or small solids and an adhesive or sealing agent. In still further examples, the adhesive or sealing agent may be further processed by exposure to an energy source such as a UV light exposure to initial a polymerization reaction in the material.

At step 835, there may be a loop process that occurs in some examples and under some situations that may cause the Addibot to return to step 830 and continue processing. In an alternative example, in some examples, as shown at step 845 a loop process may occur that may cause the Addibot to return to step 840 and continue processing.

At step 880, a step may occur where the Addibot is moved from a first location to a second location. In some examples, a characteristic of this movement is that as part of the Addibot moving the additive manufacturing system as a whole moves from a first location to a second location even if portions of the additive manufacturing system could move some or all of the printing head or other additive element to the same second location without a movement of the Addibot.

At step 890, the Addibot may deposit at the second location a second layer of material. The nature of the second deposit may comprise a different material, or a same material. The nature of the second deposit may comprise a different physical characteristic such as thickness or the same characteristic as a first deposit. The second deposit may be contiguous with a first deposit but be located at a second location and be considered a second deposit, by the very nature of being at a second location.

Referring to FIG. 18, an Addibot of a particular type may be obtained 1810 by a user. Next, at step 1820 the user may transmit a control signal to the Addibot. The transmitting may involve numerous means including a wireless transmission, a wired transmission or a transmission involving a physical interaction such as pushing a switch or a display panel of an Addibot. The initiation signal may cause a variety of responses that are proximately caused by the initiation even if further interaction with the user is or is not required or if the Addibot will flexibly respond to its environment or programming thereafter.

At 1830, in some examples the Addibot may perform an orientation step. This step may assess one or more of determining a spatial location in a spatial coordinate system and may also assess movement and direction of movement or potential movement in a spatial coordinate system.

At 1840, in some examples the Addibot may perform a metrology process on a region of a surface. In other examples at 1840 an apparatus external to an Addibot may perform a metrology process on a region of a surface and may communicate information to an Addibot related to the metrology or related to the processing of the metrology data in some form 1850. In some examples, these metrology steps may involve the measurement of surface topography in such a manner as to allow for the adjustment of the level of a forming mold as it is placed to interact with the surface.

Additionally at 1850, in some examples the Addibot may process the result of the metrology by means of a processor. The processor may in some examples identify the level of the surface. In other examples the processor may identify the presence of a crack or other defect, determine a need for such a feature to be filled or otherwise have action performed on it, and then establish the location information for the feature detected. In some examples, the detection of a defect may cause the Addibot to send a signal and wait for a user to interact with the Addibot for additional controls.

At step 1860, in some examples the Addibot will utilize the information that it has received in various manners about the surface and any desired model that results from this information and based on a digital model provide controlling signals to the additive manufacturing system. The controlling signals may cause the Addibot to adjust the level of components within the Addibot; or the level of the Addibot frame itself.

At step 1870, in some examples, the Addibot may create a first structure by extruding material into a forming mold. In some examples, the first layer of material will be comprised of thermoplastics or other extrusion materials. In some examples, the Addibot may fill a portion of the resulting formed structure with wall forming materials such as cement. In other examples, the Addibot may signal the completion of a first structure formation and another device or another Addibot may add wall forming materials to the thus formed structure.

At step 1835, there may be a loop process that occurs in some examples and under some situations that may cause the Addibot to return to step 1830 and continue processing. In an alternative example, in some examples, as shown at step 1845 a loop process may occur that may cause the Addibot to return to step 1840 and continue processing.

At step 1880, a step may occur where the Addibot is moved from a first location to a second location. In some examples, a characteristic of this movement is that as part of the Addibot moving the additive manufacturing system as a whole moves from a first location to a second location even if portions of the additive manufacturing system could move some or all of the printing head or other additive element to the same second location without a movement of the Addibot. Forming mold pieces that may be present in the Addibot may be moved vertically upwards and downwards in the process of readying the Addibot for movement and then preparing the Addibot for a next processing step.

At step 1890, the Addibot may create a second structure by extruding material into a forming mold at the second location. The nature of the second structure formed may comprise a different material, or a same material. The nature of the second structure formed may comprise a different physical characteristic such as thickness or the same characteristic as a first deposit. The second structure formed may be contiguous with a first structure formed but be located at a second location and be considered a second structure, by the very nature of being at a second location.

Line Painting and Line Feature Addition to Roadways

In some examples, an additive manufacturing robot may be used to paint or deposit line features upon or within a roadway surface. A deposited line feature may include a thermoplastic base material that may be melted upon a roadway surface. In other examples, adhesives and/or mechanical fastening devices may be used to adhere a deposited line feature upon a surface and both adhesives and thermoplastic melting of a line feature may be used to attach or imbed the feature to the roadway.

In some examples, a spool of line material may be used to store and prepare the material to be deposited upon or within the roadway. In some examples, the line material may be a composite of a base material with embedded features such as wires, optical fibers, electronics and the like that may be deposited to the roadway as an integral part. The line material may have a varied thickness from a small form factor such as one or more centimeters to wide features 10 or more centimeters in width.

The line material may have inherent color variations to match line features such as yellow, white and black, wherein the black features may be used to match a roadway and allow for dashed lines in passing lanes. In still further examples, the coloration may be added by the additive manufacturing robot while the line feature is being installed or thereafter.

Figure 19A:
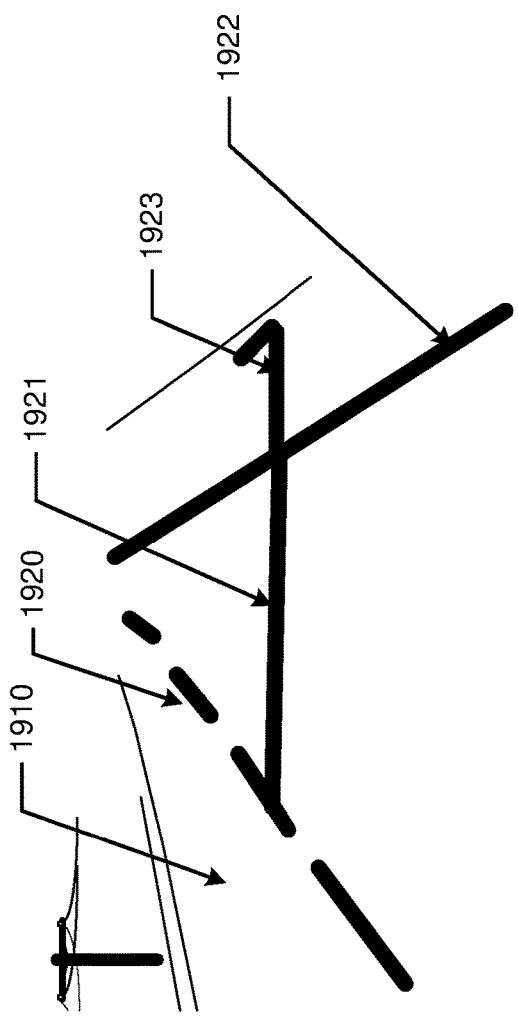

Referring now to FIG. 19A, examples of deposited line features are illustrated. A line may be deposited by an additive manufacturing robot. As has been discussed, lines may be sprayed upon a surface or other wise deposited on a surface. In some examples a solid material may be deposited upon or within a roadway 1910. The center line 1920 or the side lines 1922 may be examples of line types that may be a solid color feature or a dashed feature. The deposited line features may also cross 1921 a roadway and/or may run on the margin 1923 of the roadway. Similar lining features may exist in other roadway types such as parking lots, driveways and the like. An additive manufacturing robot may also function on vertical surfaces and roofs, and similar processing may also be performed.

Figure 19B:
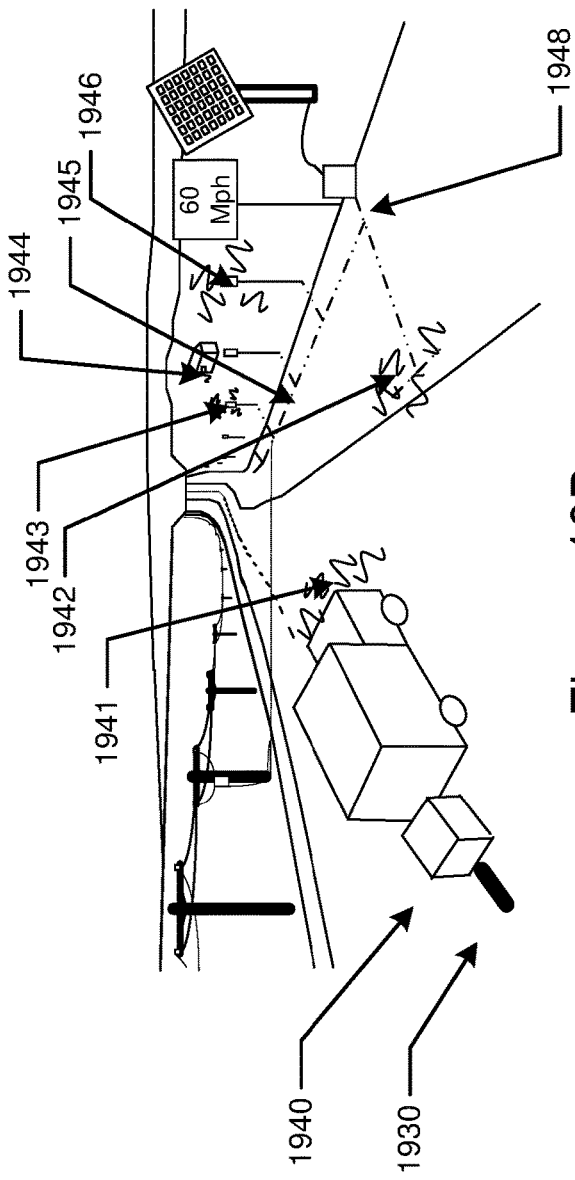

Referring now to FIG. 19B, an advanced roadway 1930 in conjunction with an Addibot 1940 is depicted in an exemplary fashion to deposit a line feature 1931. In some examples, an advanced roadway may have been formed with use of Addibots in a manner as described. The roadway may be formed with embedded sensors, antennas or other devices for facilitating communication 1941 between an Addibot 1940 and the advanced roadway 1930. Within the advanced roadway 1930 may be communication devices 1942 that may be buried within the roadway, the shoulder or the side of the roadway or be upon these locations. In some examples, there may be communication devices on roadway poles, signs and the like. The communication 1941 may comprise wireless communication and may involve radio frequency, infrared frequency, optical frequency or other forms of wireless communication. In some examples, the advanced roadway may be formed with embedded fibers 1945 formed of conductive materials or optical fiber. The embedded fibers 1945, such as optical fibers, may also be considered wires.

Communication signals may be routed through the advanced roadway and shoulders of roadways as depicted in FIG. 19B. In some examples, the communication signals may be routed out of the roadway 1948 to a wireless transmitter 1943 located along the roadway. In some examples, signals may be transmitted from one wireless transmitter 1943 to another transmitter 1946. A combination of transmission through conduits in the roadbed and to roadside transmitters may be used to transmit signals of various kinds. In some examples the signals may relate to the movement of traffic along the roadway. The signals may also relate to conditions along the roadway as detected by sensors or traffic itself. In other examples the signals may involve communication signals unrelated to the traffic and may be standard communications that are routed along roadways. The signals from the roadside communication transmitters such as wireless transmitter 1943 may be routed to neighboring structures 1944 such as residences or businesses. The transmissions in some examples may comprise standard internet communication transmissions, or in other examples the signals may relate to traffic flow along the roadway. Autonomous vehicles may use the various communications and sensor pathways as part of technological support of the traffic flow and to aid in route planning and the locating of locations that have desired placement of line features. Signals from traffic may be routed from vehicle to vehicle with the support of the roadway communication system. And, signals from traffic may be routed along wireless pathways to internet connections to central controllers for traffic flow that may be located at off road sites such as neighboring structures 1434. The internet connections may be used to transmit signals from and to remote control systems. The signals may be used to direct traffic flow as an additive manufacturing robot 1940 is depositing line features 1931 upon or within the roadway surface. In some examples, the additive manufacturing robot 1940 may also have grinding or milling equipment to create channels for the placement of line features. In other examples, forms may create the channel as the roadway is formed, or the channels may result from the patterned deposition of roadway materials.

Proceeding to FIG. 19C, an exemplary cross section shape for a roadway line feature 1950 is illustrated. The example has a trapezoidal form with a wide base that may form an adhering surface 1951. The line feature may be stored on a roll and unrolled as the additive manufacturing robot 1940 processes the line feature to the roadway. In some examples, the line feature may be heated by the additive manufacturing robot 1940 to activate a thermoplastic aspect of the line feature material or a thermally activated adhesive material in affixing the line feature to the roadway. Thermal activation may be applied to adherent surface 1951 of the line feature material which may be affixed to the roadway. There may be numerous other manners to activation adherent aspects of the line features. In an example, a non adherent release layer may be removed from the line feature as it is processed to be placed to the roadway. In other examples, there may be a chemical activation of an adhesive aspect that may be sprayed upon the line feature, the roadway or both. In other examples the removal of a protective layer may allow the line feature to interact with oxygen and begin an activation process. In some examples, high energy radiation such as visible or ultraviolet radiation may be used to initiation an activation of adherence properties.

There may be an adhesive layer that is found upon the line feature or placed to the line feature. Examples of structural adhesives include epoxy adhesives (one or two part liquids or pastes), acrylic adhesives (one or two part liquids and pastes), urethane adhesives (typically two part liquids or pastes), cyanoacrylate adhesives or anerobic adhesives. Other types of adhesives may include hot melt adhesives, rubber adhesives, contact bond adhesives, pressure sensitive adhesives and polyurethane reactive adhesives as non-limiting examples.

Proceeding to FIG. 19D, an exemplary cross section shape for an advanced roadway line feature 1950 with an exemplary adherent surface 1951 is illustrated. The example material may include embedded wires 1960, combinations of wires 1961 and cables 1962 such as optical fiber. In still further examples, proceeding to FIG. 19E, the advanced roadway line feature 1950 with an exemplary adherent surface 1951 may also include conductive traces 1970 and 1972 which may be flat layers. In some examples, the conductive trace 1972 may attach to wire features 1960. The advanced roadway line feature 1950 may also include embedded electronic components 1971. Electronic components may also include passive elements such as antennas, light sources such as LEDS, energy absorbers such as photoelectric cells and energy storage elements such as batteries.

Line features with LEDs and other electronic features attached may allow for line features to be dynamic. Thus a yellow pattern may be activated at one point and at a later point a white pattern may be substituted. Any colors may be substituted in these examples based on which colors of LED are included in the line feature. In some examples, a combination of closely located LEDS may allow for colors to be formed from combination of primary colors. Energy for electronic components may also be passed through wires in the advanced roadway line feature. The wires may also be used for communication, and data transmission. At the end of a roll of a roadway line feature there may be joining aspects that may include both physical shapes for joining as well as interconnection aspects for wires, plates and conduits.

Proceeding to FIG. 19F, an exemplary cross section of a roadway 1980 with a channel feature and a line feature 1982 is illustrated. In some examples, the line feature may be affixed within a channel 1981 of a roadway where the adherent surface may be other surfaces of the feature. The line feature may have embedded components as have been described such as in a non-limiting example wires 1983 and other discussed components. In some examples, the line feature may be fully embedded by a covering roadway surface 1985 such as asphalt concrete, concrete or the like.

CONCLUSION

The additive manufacturing system of an Addibot may include many different types and definitions capable of adding material based on a digital model in controlled fashion. In some examples, the additive manufacturing system may comprise a three dimensional ("3D") printing head. The printing head may add material to a surface in many standard manners including extrusion of a material by the printing head or ejection of material in liquid or solvated form. In some examples, the 3d printing or three dimensional printing head may comprise an array of nozzles which individually eject liquid form droplets in response to an electronic control signal provided to the nozzle. In some examples, the liquid that may be processed by the 3d printing head may comprise one or more of water, a water or aqueous solution, a hydrocarbon based solvent, an inorganic solvent or an emulsion of a combination of two or more of water, hydrocarbon or inorganic based solvents. Solutions may comprise a material solvated in one or more of the water, hydrocarbon or inorganic based solvents.

In another aspect, a dimension of time may be included wherein one or both of: a) a specified rate of extrusion and b) a specified order of extrusion is controlled in order to obtain a desired result. Embodiments may accordingly include a ratio of time over distance and rate of extrusion.

In some examples, the Addibot may also comprise a vision system. The vision system may be operant to create a digital model of the topography of a surface in a region proximate to the mobile additive manufacturing apparatus. The vision system may operate on or within the Addibot and use a variety of detection schemes for analyzing the surface and creating the model of the surface including light or laser based imaging techniques or other electromagnetic radiation based imaging including infrared, ultraviolet or other electromagnetic radiation sources. In some examples, the vision system may utilize sound based radiations to create a digital model of its surroundings which may include the surface in the region of the Addibot. In other examples, the Addibot may deploy a physical sensor to determine the topography of the surface in a region studied by the vision system. A controller located within the Addibot may initiate the operation of the vision system and may receive signals in response to the metrology that the vision system performs. In other examples, the Addibot may communicate with a vision system that is located external to itself or on another Addibot for example.

In some examples, the Addibot may also comprise a material storage system capable of storing at least a first material to be supplied to the additive manufacturing system. The stored material may include solids, powders, gels, liquids or gasses, to mention some non-limiting examples. In some examples, the material may be in wire forms or in some example may exist as physical solid entities which are placed by the additive manufacturing system. The material storage system may maintain a storage condition for the material by controlling an environmental condition. The condition that may be controlled may include one or more of temperature or pressure of the material.

In some examples, the Addibot may also comprise a surface preparation system. The surface preparation system may be capable of removing one or more of flaked surface material, dust, dirt and debris from the surface region in a region in advance of the additive manufacturing apparatus. Since the Addibot may move or when stationary the additive manufacturing system within the Addibot may move in a direction, the surface preparation system may be operant to process a region of the surface where the additive manufacturing system on its own or under the drive system of the Addibot may move to.

In some examples, the Addibot may also comprise a communication system that may be capable of transmitting signals outside the mobile additive manufacturing apparatus. In some examples users may use communications systems external to the Addibot in transmitting a control signal or control signals to the Addibot. The communication system may also be capable of receiving signals originating outside of the mobile additive manufacturing apparatus. In some examples, the signals transmitted or received may comprise one or more of radiofrequency signals, infrared signals, optical signals or sound based signals or emissions as non-limiting examples. In some examples the communication system may function to sense the environment of the mobile additive manufacturing apparatus. The sensing may occur in addition to signal transmission function. In some examples, there may be multiple communication and/or sensing systems within an Addibot.

In some examples, the power system of an Addibot may comprise a battery.

In some examples, the power system of an Addibot may comprise a combustion engine or other type of engine.

In some examples the power system of an Addibot may comprise an electrical wire that may be connected to an electrical power source that may reside external to the Addibot which may also be called a mobile additive manufacturing apparatus.

There may be numerous methods related to a mobile additive manufacturing apparatus. In some examples a user may transmit a signal to an Addibot which may include any of the types of examples of apparatus that have been described. The transmitted signal may cause the Addibot to next deposit a first layer of material on a surface utilizing systems of the Addibot. The Addibot may, in continued response to the initial signal, move from a first location to a second or different location. After moving the Addibot may in further continued response to the initial signal deposit a second layer of material. The makeup of the first layer and second layer of material may be different in composition or physical aspects such as thickness or may be identical except in the aspect that it is located in a second location.

In some examples, the methods may additionally include a step to orient the apparatus for mobile additive manufacturing, which may be called an Addibot, in a spatial coordinate system.

In some examples, the methods may additionally include a step to perform a metrology process to measure the topography of a region of a surface. This may typically be in a region proximate to the Addibot or in a region that the Addibot will move to. In some examples additional steps in the method may include processing the result of the metrology process and using the result of the processing to control the additive manufacturing system of the Addibot.

In some examples the methods relating to processing by an Addibot may include the step of depositing a layer where a material comprises water. In some of these examples, the surface upon which the material is deposited may be comprised of water. In some of these examples, the surface comprised of water may be a surface where the water is in a solid form, which may be water ice.

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. One general aspect includes a mobile additive manufacturing apparatus including: a drive system operative to move the apparatus along a surface; a navigation system to determine location and bearing; a controller capable of executing algorithms and providing control signals; an additive manufacturing system to deposit a material or combination of materials in prescribed locations across the surface according to a digital model processed by the controller; and a power system capable of providing power to operate at least the drive system, navigation system, control system and additive manufacturing system. Other embodiments of this aspect include corresponding computer systems, apparatus, and computer programs recorded on one or more computer storage devices, each configured to perform the actions of the methods.

Implementations may include one or more of the following features. The apparatus may include examples where: the additive manufacturing system includes a 3d printing head. The apparatus may include examples where: the 3d printing head includes an array of nozzles which individually eject liquid form droplets in response to an electronic control signal provided to the nozzles. The apparatus may include examples where: the liquid includes one or more of water, an aqueous solution, a hydrocarbon based solvent or an emulsion including water or hydrocarbon based solvent. The apparatus additionally including: a vision system to create a model of a topography of the surface in a region proximate to the mobile additive manufacturing apparatus. The apparatus may include examples where: the controller provides control signals to the vision system to initiate its operation and receives electrical signals in response to a metrology processing. The apparatus additionally including: a material storage system capable to store at least a first material to be supplied to the additive manufacturing system. The apparatus may include examples where: the material storage system maintains storage conditions by controlling one or more of temperature and pressure. The apparatus additionally including: a surface preparation system capable to remove one or more of flaked surface material, dust, dirt and debris from a surface region in advance of the additive manufacturing system. The apparatus additionally including: a communication system capable of transmitting signals outside the mobile additive manufacturing apparatus and receiving signals originating from outside the mobile additive manufacturing apparatus. The apparatus may include examples where: the transmitted signals include one or more of radiofrequency, infrared, optical or sound based emissions. The apparatus may include examples where: the communication system may function to receive information about an environment of the mobile additive manufacturing apparatus. The apparatus may include examples where the power system includes a battery. The apparatus may include examples where the power system includes a combustion engine. The apparatus may include examples where the power system includes an electrical wire connect to a power source external to the mobile additive manufacturing apparatus. The method additionally including: orienting the apparatus in a spatial coordinate system. The method additionally including: performing a metrology process to measure a topography of a region of the surface. The method additionally including: processing the result of the metrology process with an algorithm, and controlling the additive manufacturing system based on a result of processing the result of the metrology process with an algorithm. Implementations of the described techniques may include hardware, a method or process, or computer software on a computer-accessible medium.

One general aspect includes a method for treating a surface including: transmitting a control signal to an apparatus, where the apparatus includes: a drive system operative to move the apparatus along a surface; a navigation system to determine location and bearing, a controller capable of executing algorithms and providing control signals, an additive manufacturing system to deposit a material or combination of materials in prescribed locations across the surface according to a digital model processed by the controller. The method also includes a power system capable of providing power to operate at least the drive system, navigation system, control system and additive manufacturing system. The method also includes depositing a first layer of a material on a surface utilizing the apparatus. The method also includes moving the apparatus to a different location. The method also includes depositing a second layer of the material on the different location of the surface. Other embodiments of this aspect include corresponding computer systems, apparatus, and computer programs recorded on one or more computer storage devices, each configured to perform the actions of the methods.

Implementations may include one or more of the following features. The method additionally may include orienting the apparatus in a spatial coordinate system. The method may additionally include performing a metrology process to measure a topography of a region of the surface. The method may additionally include: processing the result of the metrology process with an algorithm, and controlling the additive manufacturing system based on a result of processing the result of the metrology process with an algorithm. Implementations of the described techniques may include hardware, a method or process, or computer software on a computer-accessible medium.

Implementation may include one or more of the following features. The method additionally may include providing a supporting surface, wherein the supporting surface may be transparent to light in selected spectral regions. The method may additionally include orienting an Addibot to a given location based upon a digital model and communication of navigation systems of an Addibot with navigation signals in their environment. In some examples, an Addibot may detect location information that is located upon the supporting surface that it rides upon. The method may additionally include irradiating a material beneath the surface by the action of a light producing component of the Addibot. In some examples, the light producing component may emit laser radiation. In other examples, the light produced may be focused intense light from other sources. In some examples, a work product beneath the supporting surface may be located beneath a layer of material. The material may comprise liquid or powder forms of material that may change a chemical or physical characteristic upon irradiation with light of selected spectral characteristics. In some examples, after receiving radiation upon the layer of material a next action may include lowering the work product to create the ability to form another layer of material.

In some examples, a wall may be formed by the placement of molding patterns for a layer at a time. Thereafter, material may be filled within the deposit formed in the shape of the molding pattern to form a solidified form. A material which may be handled in a form consistent with filling a deposit of molded material, where the material may then be solidified by its own internal reactions or by external forces or interactions may be considered a solidifying material. Cement, asphalt, and polymer precursors may comprise some examples of solidifying materials. In some examples the molded patterns may have internal closed shapes within them, and when a material is filled within the deposit formed by the molding pattern it may not fill these internal closed shapes. In some other examples, numerous layers of molded material may be formed by lifting the Addibot from layer to layer before material is filled into the molded patterns.

In some examples, the molded patterns may have numerous internal regions defined. Some of the internal regions may be filled by materials to create a wall type structure. Other internal regions may be left unfilled, or may be filled with other materials such as electrical wires as a non-limiting example. In some examples, the molded patterns may be used to create novel and advanced roadways. A variety of patterns may form single layer structures that may form features to strengthen roadways. In other examples cavities or channels may be formed into the molded material through which wires or other forms of electrically conductive material may be placed.

The resulting structures may create an infrastructure for advanced roadways through which electrical signals may be communicated. Some examples may include power and charging electrical devices, transmitters of various kinds in roadway, and transmitters of various kinds alongside of roadway. Some transmitters may communicate via wired means and others may communicate at least in part by wireless means. Within a constructed roadway as described in this disclosure there may be devices to control or generate signaling information for location, signaling information relating to the status of the roadway or sensors within the roadway. In some examples, roadway systems may be configured to transmit data along the path of the roadway. In some examples the transmission along the roadway may comprise completely wireless communication in other examples a combination of wireless and wired, sometimes with portions of the path beneath the roadbed may occur. There may also be communication from systems to equipment in the vicinity of the roadway and to neighboring commercial and residential structures.

One general aspect includes transmitting a control signal to an apparatus. The transmitting also includes a controller capable of executing algorithms and providing control signals, an additive manufacturing system to deposit a material or combination of materials in prescribed locations across a surface of the roadway according to a first digital model processed by the controller, a drive system operative to transport the additive manufacturing system along the surface, a navigation system to determine a location of the additive manufacturing system and guide the drive system, and a power system capable of providing power to operate at least the drive system, navigation system, controller and additive manufacturing system. The transmitting also includes adding a first material to the roadway with the mobile additive manufacturing apparatus, where the first material is one of an electrically conductive material or an optical cable; connecting the first material to a first device, where the first device may include at least a first antenna; receiving a first communication from a first vehicle to the first antenna; and transmitting a signal may include the first communication through the first material.

Implementations may include one or more of the following features. The method where the first vehicle is an autonomous vehicle. The first communication may include an information packet as part of technological support of a traffic flow. The first communication originated is routed from the first vehicle to a second antenna, where the second antenna was placed into the roadway by the mobile additive manufacturing apparatus. The autonomous vehicle may include a sensor whose data is communicated in the first communication. The autonomous vehicle may include an image capture device. The image device detects a need for repair. The first communication is routed to a system controller for traffic flow. The system controller remotely controls at least the first vehicle. The first material is connected to a roadside transmitter. The roadside transmitter transmits at least a radio frequency signal. The roadside transmitter transmits at least an infrared signal. The roadside transmitter transmits at least an optical signal. The communication may include at least a location information. The communication may include intra-vehicle information sharing. The communication may include guidance related information. Implementations of the described techniques may include hardware, a method or process, or computer software on a computer-accessible medium.

One general aspect includes a method for communicating electrical power between a roadway and a first device. The method also includes transmitting a control signal to an apparatus, where the apparatus is a mobile additive manufacturing apparatus may include: a controller capable of executing algorithms and providing control signals, an additive manufacturing system to deposit a material or combination of materials in prescribed locations across a surface of the roadway according to a first digital model processed by the controller, a drive system operative to transport the additive manufacturing system along the surface, a navigation system to determine a location of the additive manufacturing system and guide the drive system, and a power system capable of providing power to operate at least the drive system, navigation system, controller and additive manufacturing system. The method also includes adding a first material to the roadway with the mobile additive manufacturing apparatus, where the first material is an electrically conductive material. The method also includes connecting the first material to the first device; and flowing the electrical power to the first device. Other embodiments of this aspect include corresponding computer systems, apparatus, and computer programs recorded on one or more computer storage devices, each configured to perform the actions of the methods.

Implementations may include one or more of the following features. The method where the first material is also connected to a solar panel. The first material is also connected to a utility cable. The first device may include at least a first antenna; receiving a first communication from a first vehicle to the first antenna; and transmitting a signal may include the first communication through the first material. Implementations of the described techniques may include hardware, a method or process, or computer software on a computer-accessible medium.

A number of examples of the present disclosure have been described. While this specification contains many specific implementation details, they should not be construed as limitations on the scope of any inventions or of what may be claimed, but rather as descriptions of features specific to particular examples of the present disclosure.

Certain features that are described in this specification in the context of separate examples can also be implemented in combination in a single embodiment. Conversely, various features that are described in the context of a single embodiment can also be implemented in combination in multiple examples separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the examples described above should not be understood as requiring such separation in all examples, and it should be understood that the described components and systems can generally be integrated together in a single product or packaged into multiple products.

In addition, the processes depicted in the accompanying figures do not necessarily require the particular order shown, or sequential order, to achieve desirable results. In certain implementations, multitasking and parallel processing may be advantageous. While the disclosure has been described in conjunction with specific examples, it is evident that many alternatives, modifications and variations will be apparent to those skilled in the art in light of the foregoing description. Accordingly, this description is intended to embrace all such alternatives, modifications and variations as fall within its spirit and scope. Certain features that are described in this specification in the context of separate embodiments can also be implemented in combination in a single embodiment. Conversely, various features that are described in the context of a single embodiment can also be implemented in combination in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments. Examples of Addibots may include all system components or a subset of components and may act in multiples to perform various functions.

What is claimed is:

1. A method for depositing a line feature upon a roadway, the method comprising:
    transmitting a control signal to an apparatus, wherein the apparatus is a mobile additive manufacturing apparatus comprising:
        a controller capable of executing algorithms and providing control signals,
        an additive manufacturing system to deposit a line feature material at prescribed locations across a surface of the roadway according to a first digital model processed by the controller,
        a drive system operative to transport the additive manufacturing system along the surface,
        a navigation system to determine a location of the mobile additive manufacturing system and guide the drive system, and
        a power system capable of providing power to operate at least the drive system, navigation system, controller and additive manufacturing system;
    adding a first material to the roadway with the mobile additive manufacturing apparatus, wherein the first material is stored as a roll of preformed line feature material;
    moving the mobile additive manufacturing apparatus with the drive system to a new location;
    confirming the location of the mobile additive manufacturing system with the navigation system; and
    adding the first material to the roadway when the mobile additive manufacturing system is at the new location.

2. The method of claim 1 wherein the mobile additive manufacturing apparatus operates autonomously.

3. The method of claim 2 wherein the line feature material comprises a base formed of thermoplastic material.

4. The method of claim 3 wherein the line feature material is heated by the mobile additive manufacturing apparatus.

5. The method of claim 3 wherein the line feature material comprises an embedded wire.

6. The method of claim 3 wherein the line feature material comprises an embedded electronic component.

7. The method of claim 6 wherein the embedded electronic component comprises an LED.

8. The method of claim 6 wherein the embedded electronic component comprises an antenna.

9. The method of claim 8 wherein the antenna lies at the surface of the line feature material.

10. The method of claim 2 wherein the line feature material comprises a heat sensitive adhesive.

11. The method of claim 10 wherein a surface of the line feature material is painted by the mobile additive manufacturing robot as part of placing the line feature material upon the roadway.

12. The method of claim 10 wherein the line feature material comprises an embedded wire.

13. The method of claim 10 wherein the line feature material comprises an embedded electronic component.

14. The method of claim 13 wherein the embedded electronic component comprises an LED.

15. The method of claim 13 wherein the embedded electronic component comprises an antenna.

16. The method of claim 15 wherein the antenna lies at the surface of the line feature material.

17. The method of claim 1 wherein the mobile additive manufacturing robot forms a channel into the roadway into which the line feature material is placed.

18. The method of claim 17 wherein the line feature material comprises an embedded electronic component.

19. The method of claim 18 wherein the embedded electronic component comprises an LED.

20. The method of claim 18 wherein the embedded electronic component comprises an antenna.

* * * * *